US012812626B2

(12) United States Patent
Aldana et al.

(10) Patent No.: US 12,812,626 B2
(45) Date of Patent: Nov. 24, 2026

(54) SYSTEMS AND METHODS OF FACILITATING COEXISTENCE

(71) Applicant: Meta Platforms Technologies, LLC, Menlo Park, CA (US)

(72) Inventors: Carlos Horacio Aldana, Mountain View, CA (US); Kanji Mavji Kerai, London (GB); Claudio Rafael Cunha Monteiro da Silva, Kirkland, WA (US); Abhishek Kumar Agrawal, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 304 days.

(21) Appl. No.: 18/624,972

(22) Filed: Apr. 2, 2024

(65) Prior Publication Data

US 2025/0081179 A1 Mar. 6, 2025

Related U.S. Application Data

(60) Provisional application No. 63/536,307, filed on Sep. 1, 2023.

(51) Int. Cl.
*H04W 72/12* (2023.01)

(52) U.S. Cl.
CPC ............................... *H04W 72/1215* (2013.01)

(58) Field of Classification Search
CPC ................................................ H04W 72/1215
See application file for complete search history.

(56) References Cited

U.S. PATENT DOCUMENTS

2016/0277364 A1* 9/2016 Solow ........................ H04L 9/14
2016/0353382 A1* 12/2016 Xue .................. H04W 52/0251
2024/0088938 A1* 3/2024 Pakrooh ................ H04L 5/0007

FOREIGN PATENT DOCUMENTS

EP 1116391 A2 7/2001
EP 4120794 A1 1/2023
GB 2494574 A 3/2013

OTHER PUBLICATIONS

International Preliminary Report on Patentability for International Application No. PCT/US2024/044960, mailed Mar. 12, 2026, 10 pages.
International Search Report and Written Opinion for International Application No. PCT/US2024/044960, mailed Dec. 9, 2024, 14 pages.

(Continued)

*Primary Examiner* — Chuong A Ngo
(74) *Attorney, Agent, or Firm* — Foley & Lardner LLP

(57) ABSTRACT

Systems and methods for facilitating coexistence may include a first wireless communication device which transmits a traffic indication packet (TIP) on an advertising channel. The TIP may one or more frequencies and one or more time periods in which the first wireless communication device is to exchange/communicate traffic with a second wireless communication device. The first wireless communication device may transmit traffic to the second wireless communication device, on one or more channels corresponding to the one or more frequencies, during the one or more time periods.

20 Claims, 19 Drawing Sheets

(56) References Cited

OTHER PUBLICATIONS

Kabbinale A.R., et al., "Details of NB Minoring Channel—Narrowband / UWB Coupling MAC," IEEE Draft, May 12, 2022, [Retrieved on May 12, 2022], vol. 802.15.4ab, No. 2, 15 Pages, Retrieved from the Internet URL: https://mentor.ieee.org/802.15/dcn/22/15-22-0276-02-04ab-details-of-nb-mirroring-channel.pptx.
Lee M., et al., "Recap of Narrowband / UWB Coupling MAC," IEEE Draft, Mar. 14, 2022, [Retrieved on Mar. 14, 2022], vol. 802.15.4ab, 18 Pages, Retrieved from the Internet URL: https://mentor.ieee.org/802.15/dcn/22/15-22-0180-00-04ab-recap-of-narrowband-uwb-coupling-mac.pptx.

* cited by examiner

800

1100A

1100C

SYSTEMS AND METHODS OF FACILITATING COEXISTENCE

CROSS-REFERENCE TO RELATED APPLICATIONS

This application claims the benefit of and priority to U.S. Provisional Application No. 63/536,307, filed Sep. 1, 2023, the contents of which are incorporated herein by reference in its entirety.

BACKGROUND

Wireless devices may use or leverage different wireless technologies for wireless communication or transmission. For example, a wireless device may use ultra-wideband (UWB) technology, Bluetooth technology, and/or Wi-Fi technology for wireless communication. Some wireless devices, which are located in a common or adjacent environment, may use different wireless technologies, which could cause interference.

SUMMARY

In one aspect, this disclosure is directed to a method. The method may include transmitting, by a first wireless communication device, a traffic indication packet (TIP) on an advertising channel (e.g., dedicated BT/WiFi/UWB advertising channel), the TIP indicating one or more frequencies and one or more time periods (e.g., time blocks for particular frequencies) in which the first wireless communication device is to communicate/exchange traffic (e.g., WiFi/UWB/BT traffic) with a second wireless communication device. The method may include transmitting, by the first wireless communication device, traffic to the second wireless communication device, on one or more channels corresponding to the one or more frequencies, during the one or more time periods.

In some embodiments, the one or more frequencies include a plurality of frequencies corresponding to a frequency hopping pattern. In some embodiments, the one or more time periods include a first time period for a first frequency of the one or more frequencies, the first time period including an offset and a duration (e.g., offset from a reference time or previous terminal block, and a block duration). In some embodiments, the one or more time periods include a second time period for the first frequency (e.g., include multiple separate time periods for the same frequency), the second time period including a second offset and a second duration. In some embodiments, the one or more frequencies include a frequency range between a minimum frequency and a maximum frequency, where the minimum frequency corresponds to a first channel of the one or more channels and the maximum frequency corresponds to a second channel of the one or more channels.

In some embodiments, transmitting the TIP on an advertising channel includes broadcasting, by the first wireless communication device, the TIP on the advertising channel. In some embodiments, the advertising channel includes a dedicated channel of at least one of a wireless local area network (WLAN) or a wireless personal area network (WPAN). In some embodiments, the first wireless communication device includes an ultrawideband (UWB) device, the UWB device including at least one of a narrowband (NB) UWB device or a NB-assisted (NBA) UWB device. In some embodiments, transmitting the traffic to the second wireless communication device includes transmitting, by the first wireless communication device, first traffic to the second wireless communication device on a first channel, the first traffic transmitted via a wireless local area network (WLAN) to the second wireless communication device; and transmitting, by the first wireless communication device, second traffic to the second wireless communication device on a second channel, the second traffic transmitted via a wireless personal area network (WPAN) to the second wireless communication device.

In another aspect, this disclosure is directed to a first wireless communication device including one or more wireless transceivers and one or more processors configured to transmit, via the one or more wireless transceivers, a traffic indication packet (TIP) on an advertising channel, the TIP indicating one or more frequencies and one or more time periods in which the first wireless communication device is to exchange traffic with a second wireless communication device. The one or more processors may be configured to transmit, via the one or more wireless transceivers, traffic to the second wireless communication device, on one or more channels corresponding to the one or more frequencies, during the one or more time periods.

In some embodiments, the one or more frequencies include a plurality of frequencies corresponding to a frequency hopping pattern. In some embodiments, the one or more time periods include a first time period for a first frequency of the one or more frequencies, the first time period including an offset and a duration. In some embodiments, the one or more time periods include a second time period for the first frequency, the second time period including a second offset and a second duration. In some embodiments, the one or more frequencies include a frequency range between a minimum frequency and a maximum frequency, where the minimum frequency corresponds to a first channel of the one or more channels and the maximum frequency corresponds to a second channel of the one or more channels.

In some embodiments, the one or more processors are configured to broadcast, via the one or more wireless transceivers, the TIP on the advertising channel. In some embodiments, the advertising channel include a dedicated channel of at least one of a wireless local area network (WLAN) or a wireless personal area network (WPAN). In some embodiments, the first wireless communication device includes an ultrawideband (UWB) device, the UWB device including at least one of a narrowband (NB) UWB device or a NB-assisted (NBA) UWB device. In some embodiments, the one or more processors are configured to transmit, via a first wireless transceiver, first traffic to the second wireless communication device on a first channel, the first traffic transmitted via a wireless local area network (WLAN) to the second wireless communication device; and transmit, via a second wireless transceiver, second traffic to the second wireless communication device on a second channel, the second traffic transmitted via a wireless personal area network (WPAN) to the second wireless communication device.

In yet another aspect, this disclosure is directed to a method. The method may include receiving, by a first wireless communication device from a second wireless communication device, a first traffic indication packet (TIP) on an advertising channel, the first TIP indicating one or more frequencies and one or more time periods in which the second wireless communication device is to exchange traffic. The method may include selecting, by the first wireless communication device, one or more channels on which to communicate traffic with a third wireless communication device, according to the first TIP. The method may include transmitting, by the first wireless communication device, a second TIP on an advertising channel, the second TIP indicating the one or more channels on which to communicate the traffic with the third wireless communication device. The method may include transmitting, by the first wireless communication device, the traffic to the third wireless communication device, on the selected one or more channels.

In some embodiments, the method includes selecting, by the first wireless communication device, an intermediate time period, between a first time period and a second time period of the TIP, in which to transmit the traffic on the one or more channels.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
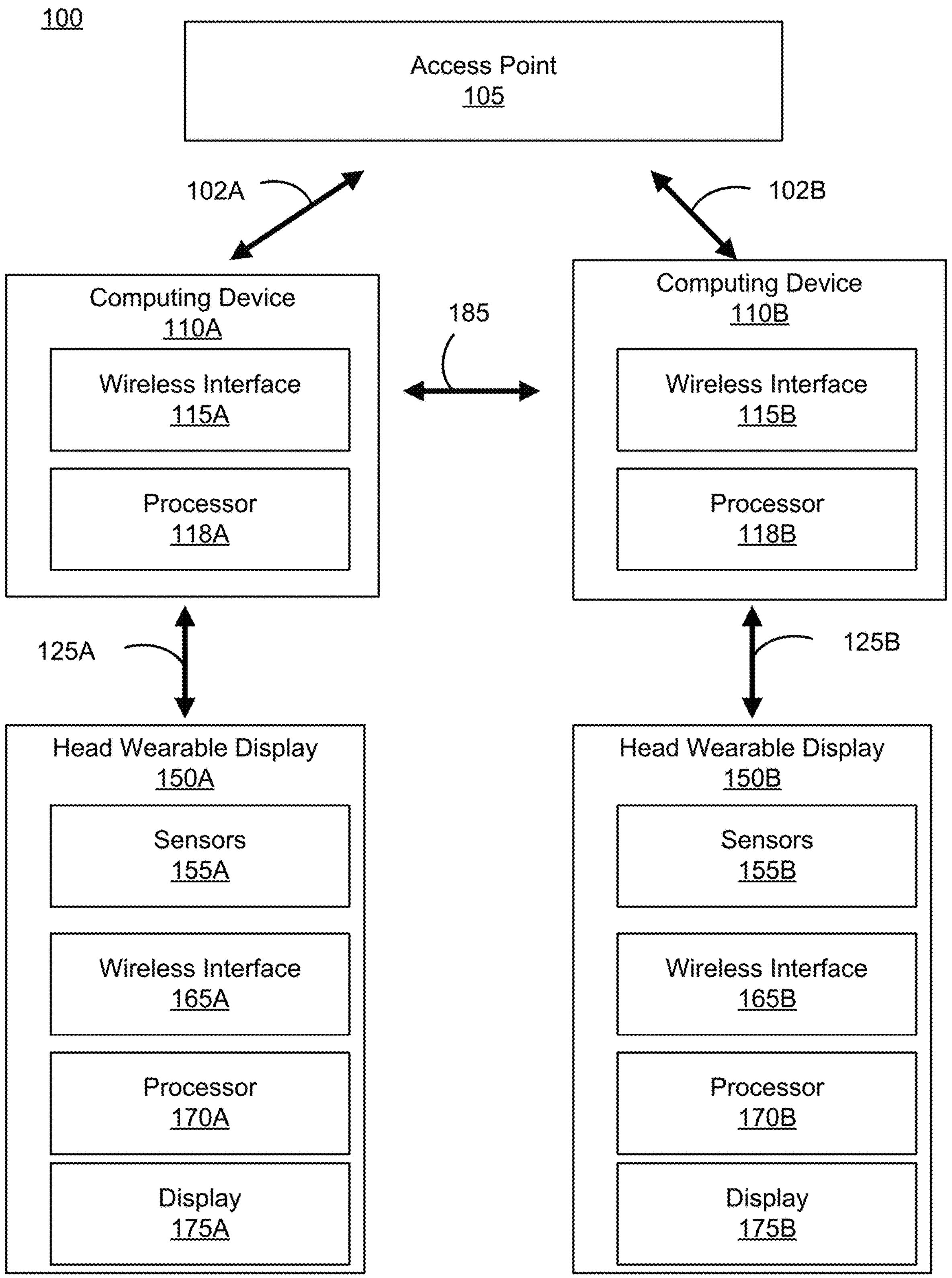
FIG. 1 is a diagram of a system environment including an artificial reality system, according to an example implementation of the present disclosure.
Figure 2:
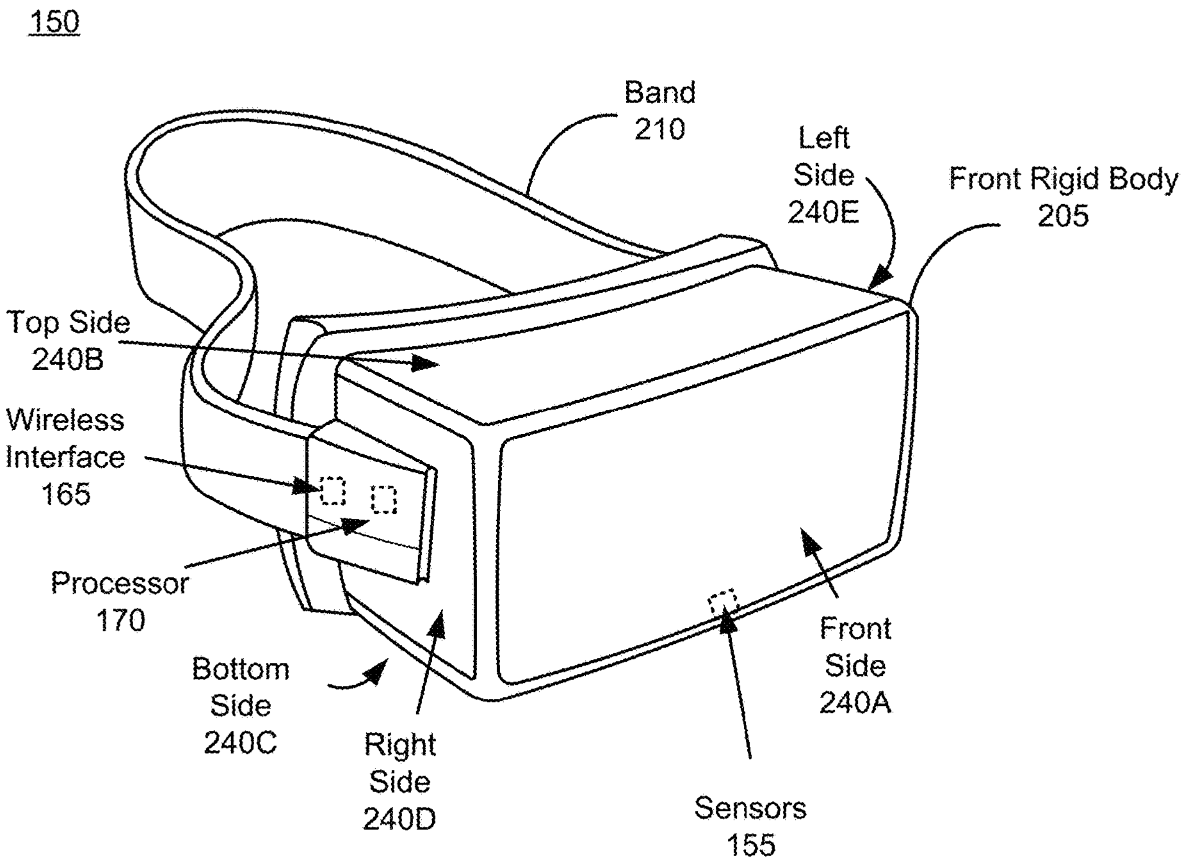
FIG. 2 is a diagram of a head wearable display, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum. In various embodiments, UWB devices may operate in the 3-10 GHz unlicensed spectrum, for example, and may use 500+ MHz channels. These channels may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. As UWB employs relatively simple modulation, it may be implemented at low cost and low power consumption. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with possible loss in link margin.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as stage devices or consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10s to 100s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHZ spectrum the most widely available globally (and Wi-Fi is not present in this spectrum), the 7-8 GHz spectrum may operate satisfactory both based on co-channel interference and processing gains.

Figure 3:
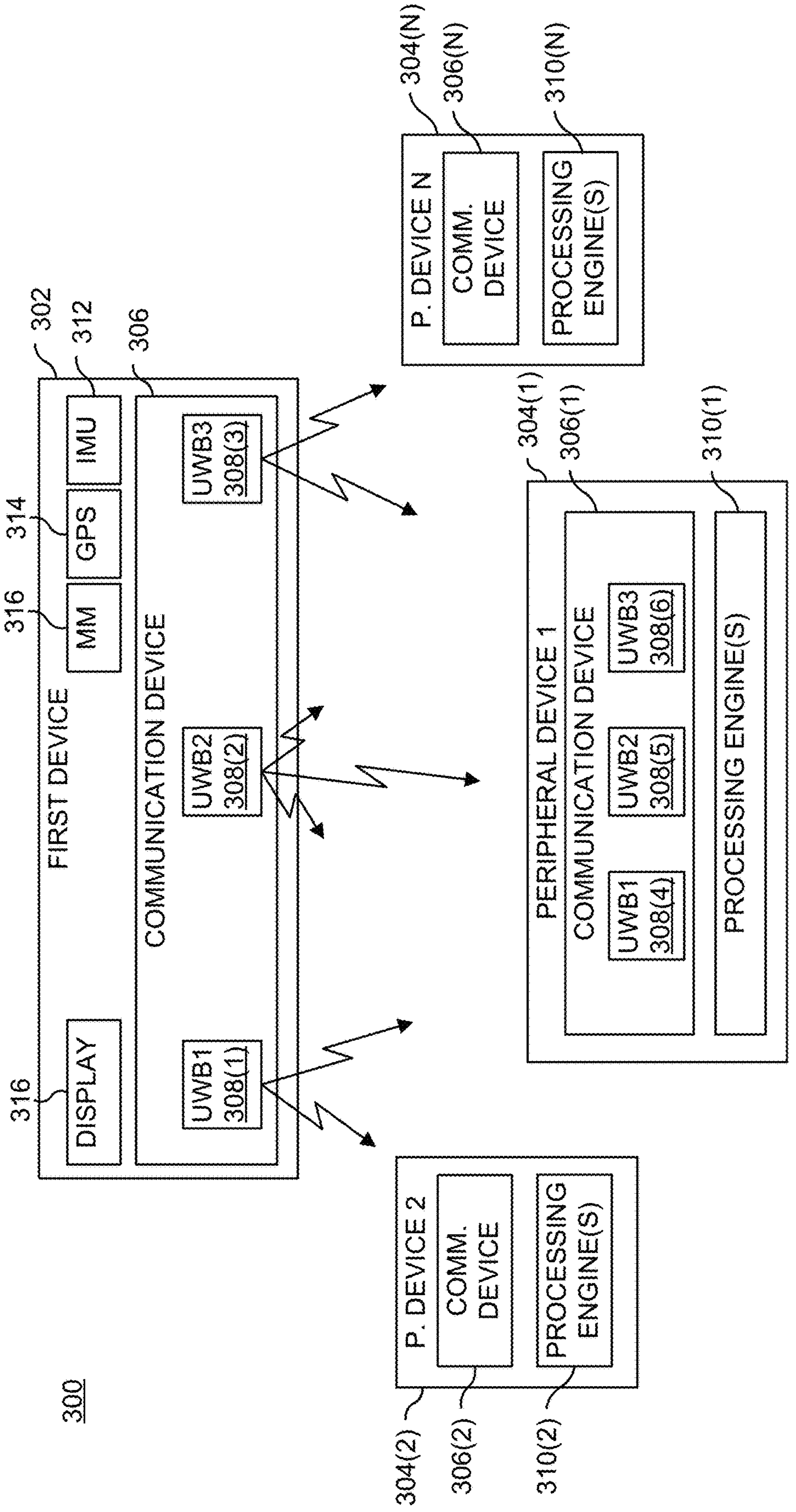
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304 (N) (also referred to as “peripheral device 304” or “device 304”). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHZ) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, stage/console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

Figure 4:
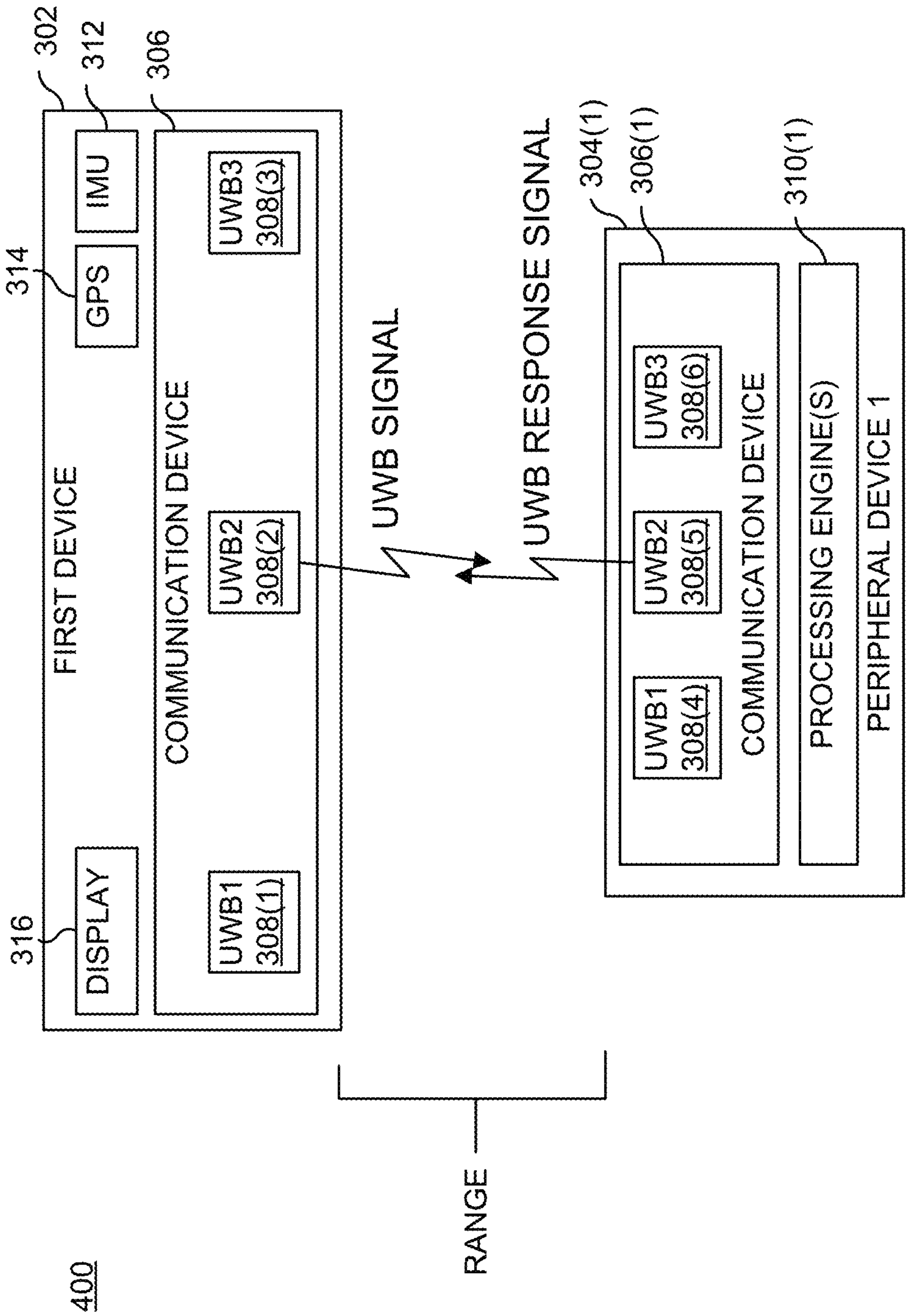
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHZ and 10.6 GHz) and having a high bandwidth (e.g., 500 MHZ). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
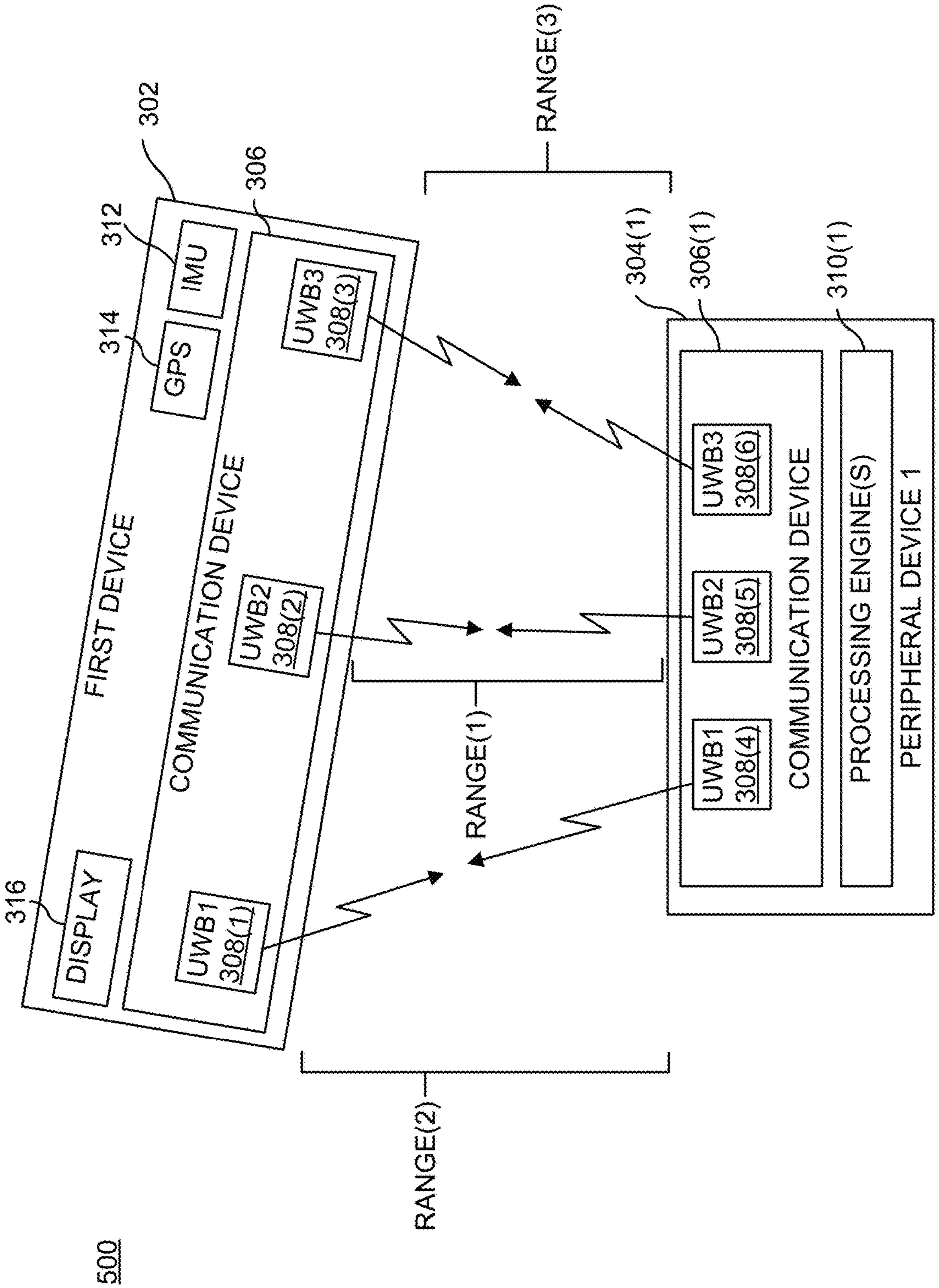
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range (1), range (2), and range (3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range (1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range (2) and third range (3) similar to computing the range (1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range (1) (or phase differences) to determine a yaw of the first device 302 relative to the peripheral device 304, another one of the ranges relative to the first range (1) (or phase differences) to determine a pitch of the first device 302 relative to the peripheral device 304, another one of the ranges relative to the first range (1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

Figure 6:
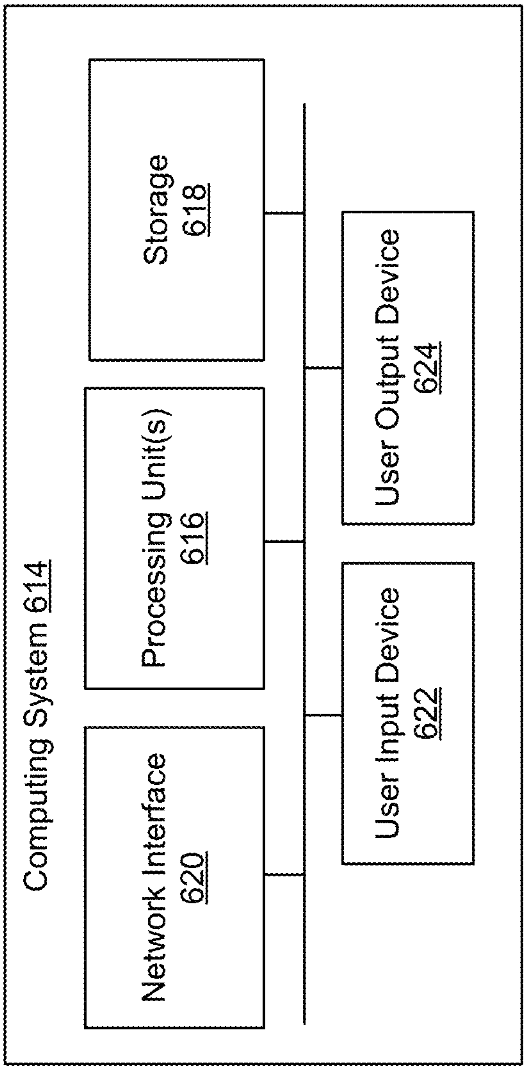
FIG. 6 is a block diagram of a computing environment, according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150, devices 302, 304, or each of the components of FIG. 1-5 are implemented by or may otherwise include one or more components of the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Referring generally to FIG. 7-FIG. 13, this disclosure is directed to systems and methods of facilitating coexistence. As some wireless technologies, such as Bluetooth and ultra-wideband (UWB), migrate towards 5 GHz and 6 GHz frequency band usages, there may be coexistence with other wireless technologies (such as wireless local area networks (WLAN), such as Wi-Fi). Thus, it may be advantageous for WLAN and high-powered narrow band (NB) devices to share the wireless medium efficiency. Some WLAN devices may support puncturing of frequency band channels (such as 20 MHz sub-band channels), but may not be aware of which sub-band to puncture. Thus, the systems and methods described herein may provide a mechanism by which WLAN and other devices are made aware of which sub-bands to puncture and when to perform puncturing of the corresponding sub-bands. According to the systems and methods described herein, the different wireless devices can share their planned medium usage by sharing frequencies and/or time blocks over which usage is planned for the respective devices. By sharing such information, wireless communication devices may transmit around (or puncture) the narrow-band transmissions that would otherwise cause large throughput and latency degradations.

Figure 7:
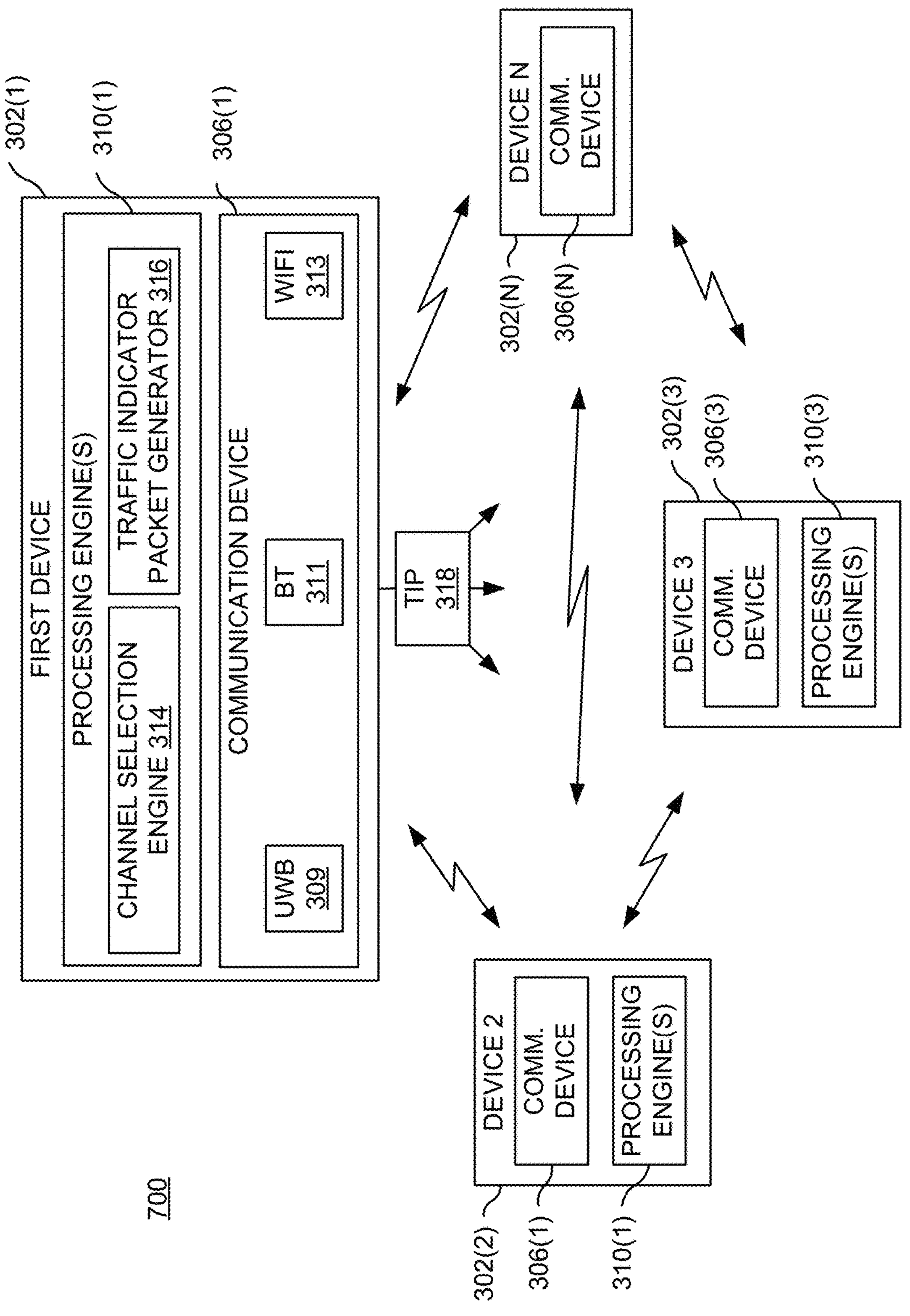
FIG. 7 a block diagram of a system for facilitating coexistence, according to an example implementation of the present disclosure.

Referring specifically to FIG. 7, depicted is a block diagram of a system 700 for facilitating coexistence, according to an example implementation of the present disclosure. The system 700 may include a plurality of devices (302(1)-302(N) (referred to generally as "device 302"). In some embodiments, at least one of the devices 302 may be or include an access point, which may be similar to the access point 105 described above with reference to FIG. 1. The devices 302 may be similar to the first device 302 and the peripheral device(s) 304, described above with reference to FIG. 1 through FIG. 6. The devices 302 may include a communication device 306 including or supporting various wireless communication technology, including for instance WPAN communication via one or more WPAN antennas, devices, or transceivers (e.g., UWB transceiver 309 and/or 2.4 GHz transceiver, such as a BT transceiver 311) and/or WLAN communication via one or more WLAN antennas or transceivers (e.g., WI-FI transceiver 313). While each of these wireless communication technologies are shown as being supported by the first device 302(1), in various embodiments, fewer or different wireless communication technologies may be supported by a respective device. For example, the first device 302(1) may include a communication device 306(1) which supports WLAN and UWB communication, the second device 302(2) may include a communication device 306(2) which supports WLAN and BT communication, and the N-th device 302(N) may include a communication device 306(N) which supports WLAN communication. As such, various combinations and permutations of devices may be included or provided in various environments and contexts.

In various embodiments and instances, such as the example environment shown in FIG. 7, multiple devices 302 operating in a common environment may occupy various frequency channels or bandwidths. As described above, some wireless communication technologies may support communication on frequencies which overlap those used by other wireless communication technologies. As described in greater detail below, a device 302 may be configured to generate and transmit a traffic indication packet (TIP) 318 on an advertising channel, where the TIP 318 indicates one or more frequencies and time periods in which the device 302 is to communicate/exchange traffic with another device 302. The device 302 may transmit traffic to the other device 302 according to the TIP 318, e.g., on one or more channels corresponding to the one or more frequencies, during the one or more time periods.

The devices 302 may include respective communication devices 306. The communication devices 306 may be or include any device, component, element, or hardware designed or configured to facilitate communication over a medium. For instance, the communication devices 306 may include transceivers including various antenna(s) configured to communicate over a wireless medium. As shown in FIG. 7, the communication device 306(1) of the first device 302(1) may include a plurality of transceivers for communicating according to a plurality of wireless communication protocols. For example, the communication device 306(1) may include one or more WPAN transceivers, such as a UWB transceiver 309 (e.g., a narrowband (NB) UWB transceiver 309 and/or a NB-assisted (NBA) UWB transceiver 309) and/or a BT transceiver 311. The WPAN transceivers may be configured to communicate locally on a WPAN, according to a WPAN protocol. For example, the first device 302(1) may be configured to communicate with another device 302(2) (such as a BT or UWB speaker, a BT or UWB controller, etc.) via respective WPAN transceivers of the respective communication devices 306(1), 306(2), and using a corresponding WPAN protocol. The communication device 306(1) may include a WLAN transceiver, such as a WI-FI transceiver 313. The WLAN transceiver may be configured to communicate locally on a WLAN, according to a WLAN protocol. Continuing the above example, the first device 302(1) may be configured to communicate with the access point (such as device N 302(N)), via respective WLAN transceivers of the respective communication devices 306(1), 306(N), to receive data (such as audio or music) streamed from a remote source. In various embodiments, the first device 302 may be configured to communicate such data received from the access point, via the WPAN, to the peripheral devices 302(2) for rendering.

The device(s) 302 may include one or more processing engine(s) 310. The processing engine(s) 310 may be or include any device, component, element, or hardware designed or configured to perform one or more functions described herein. The processing engine(s) 310 may be similar to the processing engine(s) 310 described above. While shown as being included on the devices 302 generally, it is noted that, in some embodiments, the processing engine(s) 310 may be hardware of the communication device 306 of the device 302 and/or hardware of the transceiver(s) of the communication device 306.

In some embodiments, the processing engine(s) 310 may include one or more processor(s) and memory, where the memory stores or maintains instructions executed by the processor(s) to perform the corresponding function(s) of the processing engine 310. The processor(s) of the processing engine(s) 310 may be similar to the processors 118, 170 or processing unit(s) 616 describe above, and the memory may be similar to the storage 618 described above. The processing engine(s) 310 may include a channel selection engine 314 and a traffic indicator packet (TIP) generator 316, described in greater detail below. While these processing engine(s) 310 are shown and described, it is noted that, in various embodiments, additional or alternative processing engine(s) 310 may be deployed or supported by the respective device. Further, and in various embodiments, two or more of the processing engine(s) 310 may be combined into a single processing engine 310, and/or a processing engine 310 may be divided into multiple processing engine(s) 310.

Figure 8:
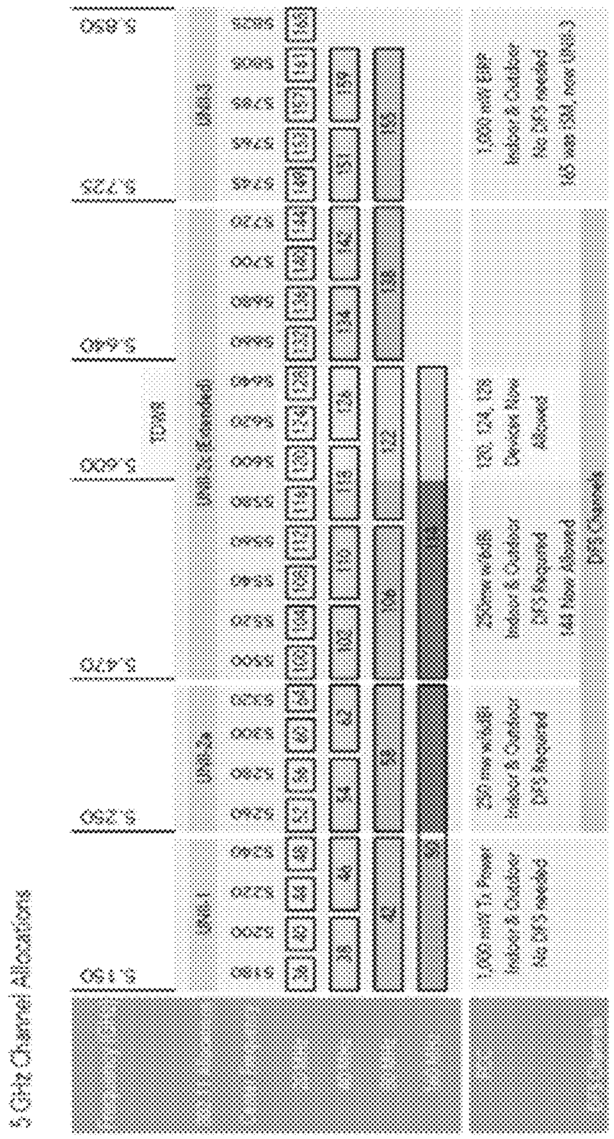
FIG. 8 is a channel diagram showing channels allocated for one frequency range, according to an example implementation of the present disclosure.
Figure 9:
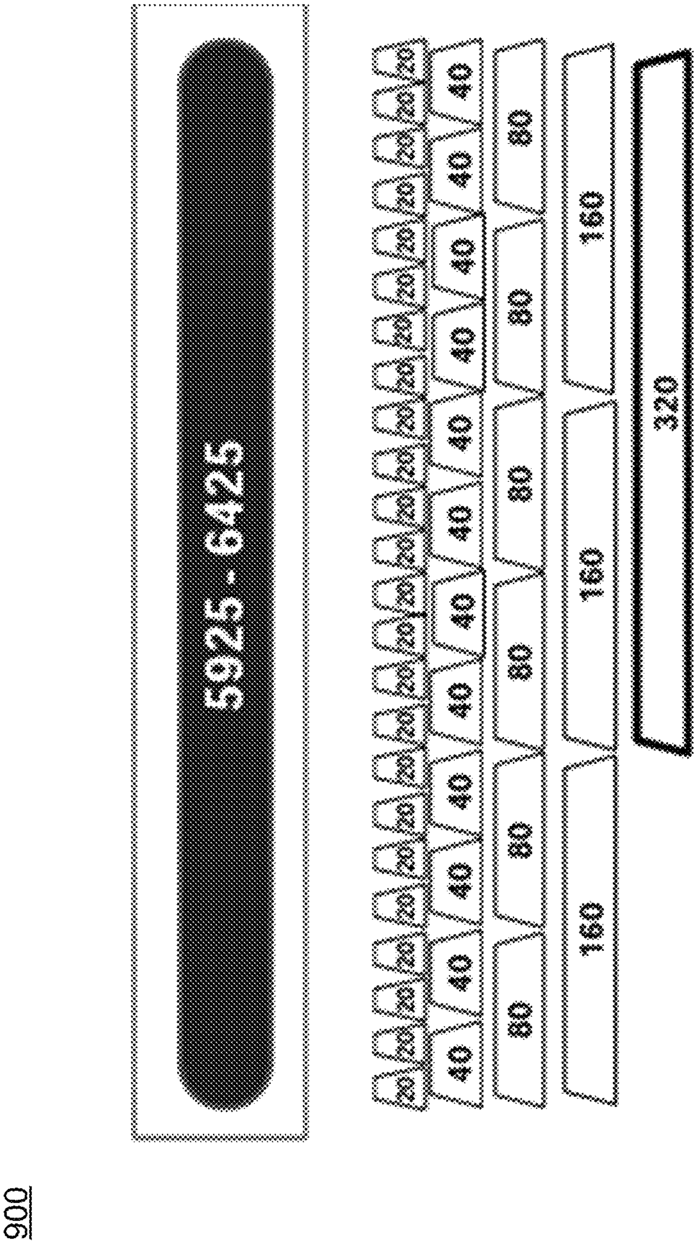
FIG. 9 is a channel diagram showing channels allocated for another frequency range, according to an example implementation of the present disclosure.

Referring briefly to FIG. 8 and FIG. 9, depicted are channel diagrams 800, 900 showing channels allocated for a frequency range between 5,150 MHz and 6,425 MHz, according to an example implementation of the present disclosure. In various embodiments, the WLAN protocol may involve or include a certain channel bandwidth for communication. Such channel bandwidth for the WLAN protocol may be, for example, 20 MHz, 40 MHz, and/or 80 MHz (contiguous). Assuming a WLAN device or transceiver (such as the WI-FI transceiver 313) is operating with a 20 MHz channel bandwidth, the WLAN transceiver may be configured to establish connections on any of the 20 MHz WLAN channels shown in FIG. 8 and FIG. 9.

Similar to the WLAN protocol, various WPAN protocols may involve or include a certain channel bandwidth for communication. Such channel bandwidth for the WLAN protocol may be, for example, 2 MHz and/or 2.5 MHz. For example, a WPAN protocol for BT communication may include a 2 MHz channel bandwidth, and a WPAN protocol for UWB communication may include a 2.5 MHz channel bandwidth. However, the WPAN protocol may include establishing or maintaining a plurality of channels, such as five (or more) channels. As such, in operation, a WPAN device or transceiver may be configured to use five (or more) channels for communication, which may result in using a total of 20 MHz bandwidth. Continuing the above example, assuming a 2 MHz channel bandwidth for BT communication, a BT device or transceiver 311 may be configured to use ten 2 MHz channels (totaling 20 MHZ total bandwidth). Similarly, assuming a 2.5 MHz channel bandwidth for UWB communication, a UWB device or transceiver 309 may be configured to use eight 2.5 MHz channels (again, totaling 20 MHz total bandwidth). Some WPAN protocols may support frequency hopping between different frequency channels. As such, according to various embodiments, the WPAN device or transceiver may be configured to use multiple channels, but such channels may not be needed to be contiguous.

Some WPAN devices or transceivers may support communication on higher frequencies, for example in the 5 GHz-6 GHz frequencies on channels shown in FIG. 8 and FIG. 9. For example, in various embodiments, WLAN devices or transceivers may be configured to operate with a 80 MHz channel bandwidth (or 20/40 MHz channel bandwidth), on a frequency channel within a frequency range, which may be between 5,150 MHz and 6,425 MHz. In various embodiments, some WPAN devices or transceivers may support communication on one or more channels within the same frequency range as that used by such WLAN devices or transceivers. Where such transceivers are co-operating in the same frequency range, interference between the communication protocols can occur.

Referring back to FIG. 7, the devices 302 may include a channel selection engine 314. The channel selection engine 314 may be or include any device, component, element, or hardware designed or configured to identify, determine, or otherwise select a channel on which to establish a connection. In some embodiments, the channel selection engine 314 may be configured to select one or more channels in which to establish one or more connections between one device 302 and another device 302. In some embodiments, the channel selection engine 314 may be configured to select the channel(s) within a frequency range which includes channel(s) reserved for WLAN devices. For example, the channel selection engine 314 may be configured to select the channel(s) within a frequency range between 5,150 MHz and 6,425 MHz, which includes various 20/40/80 MHz channels that may be used for WLAN communications.

In some embodiments, the channel selection engine 314 may be configured to select the one or more channels within the frequency range including channels reserved for WLAN communications. In some embodiments, the channel selection engine 314 may be configured to select the one or more channels, according to one or more channel selection rules. For example, within the frequency range, certain 20 MHz channels may have a lesser likelihood of interfering with channels typically occupied by WLAN devices in the environment. Continuing this example, assuming that an access point operates in the UNII-1 frequency band (e.g., 5,150-5,250 MHZ), with a 80 MHz channel bandwidth, the access point may occupy channel 42 (or 5,170-5,250 MHZ). As such, the channel selection engine 314 may be configured to select one or more channels according to one or more channel selection rules indicating that, if channels are to be selected in UNII-1, such channels should be selected within the 20 MHz channel which will likely not be occupied by the access point (e.g., between 5,150-5,170 MHz). While this example is provided for UNII-1, it is noted that similar rules may be applied for UNII-3 and UNII-5 (though because these frequency bands have more 80 MHz channels, additional 20 MHZ frequency bands may be available for additional connections). Further, the channel selection rule (s) for a particular frequency band may accommodate for future iterations of, e.g., WLAN usage of wider frequency bands (or other wireless technologies which use wider frequency bands of 160 MHz or 320 MHz). For example, a 320 MHz frequency band for UNII-5 may start at 6,105 MHz, and therefore the channel selection rules may indicate to prioritize selection of 20 MHz channels in UNII-5 which are below 6,105 MHZ.

The channel selection engine 314 may be configured to determine one or more time periods for transmission(s) on the channel. The channel selection engine 314 may be configured to determine the time period(s) based on or according to the type of transmission(s) and/or traffic to be exchanged between the devices 302. For example, the channel selection engine 314 may be configured to determine the time period(s) based on if the traffic is a traffic burst (e.g., traffic exchanged over a short interval) and/or periodic traffic (e.g., ongoing exchange of traffic between the devices 302). The channel selection engine 314 may be configured to determine the time period(s) based on or according to a resource or application (or resource/application type) executing on the device 302 which is to use or leverage the connection for exchange of traffic. For example, if the resource executing on the device 302 is a video call or conference application, the channel selection engine 314 may be configured to determine that the traffic is periodic traffic (e.g., as part of the video or conference call) and determine the time period(s) based on a frequency of data (e.g., audio/video) traffic to be exchanged between the devices.

The devices 302 may include a traffic indicator packet (TIP) generator 316. The TIP generator 314 may be or include any device, component, element, or hardware designed or configured to create, produce, populate, compile, or otherwise generate a TIP 318. The TIP 318 may be or include a packet or frame which identifies or indicates a frequencies and time periods in which various channels will be occupied for communication between the device 302 and another device 302. For example, the TIP 318 may indicate the frequencies and time periods identified by the channel selection engine 314. In some embodiments, the TIP 318 may be or include an information element (IE) of a beacon frame (e.g., for WLAN communications), a fast initial link setup (FILS) frame, and/or a probe response frame (e.g., unsolicited response frame). In various embodiments, the TIP 318 may include various levels of granularity as described in greater detail below with reference to FIG. 10A-FIG. 11D. According to various embodiments described herein, the corresponding channel selection engine 314 may be configured to select frequency(s) and time period(s) according to a TIP 318 provided/transmitted/broadcast by other device(s) 302 in the environment.

The device 302 may be configured to communicate, transmit, send, broadcast, or otherwise provide the TIP 318 to other device(s). In some embodiments, the device 302 may be configured to transmit the TIP 318 to other device(s) 302, to indicate the selected frequency(s) and time period(s) in which the device 302 is to exchange traffic with a second device. The device 302 may be configured to transmit the TIP 318 on a dedicated channel, such as an advertising channel. In some embodiments, the device 302 may be configured to transmit the TIP 318 on an advertising channel of a particular wireless communication protocol. For example, the device 302 may be configured to broadcast the TIP 318 on a (e.g., dedicated) WLAN advertising channel and/or a (e.g., dedicated) WPAN advertising channel. In this regard, other device(s) 302 may be configured to receive the TIP 318 broadcast on the advertising channel, by periodically "listening" on the advertising channel.

The devices 302 may be configured to transmit, send, communicate, provide, or otherwise exchange traffic according to the respective TIPs 318. For example, a first device 302 which broadcasted a TIP 318 defining frequency(s) and time period(s) in which the first device 302 is to exchange traffic with a second device 302, may be configured to exchange traffic with the second device 302 according to the TIP 318. Such exchange of traffic may include exchanging traffic according to different wireless communication protocols, according to a frequency hopping pattern, etc. For example, the first device 302 may be configured to perform one or more first transmissions on a first frequency or channel during a first time period via the UWB transceiver 309, and can perform one or more second transmissions on a second frequency or channel during a second time period via the BT transceiver 311 or WLAN transceiver 313. In this regard, the first device 302 may be configured to switch between different wireless communication technologies, different frequency channels, etc. at different time periods, according to the TIP 318.

Referring to FIG. 10A-FIG. 10D, depicted are timing diagrams 1000A-D illustrating frequency and time periods which may be occupied by various devices in an environment, according to example implementations of the present disclosure. As described above, one or more TIPs 318 may indicate or otherwise identify the frequency and time period (s) in which channels are to be occupied by various devices 1000. As shown in FIG. 10A-FIG. 10D, the progression of TIPs 318 may increase in granularity, with the timing diagram 1000A showing a TIP 318 which includes granular information relating to offsets, time periods, and frequencies, and with timing diagram 1000D showing a TIP 318 which shows more general occupancy information. However, it is noted that, for each of the example timing diagrams of FIG. 10A-FIG. 10D, the timing diagrams 1000A-D illustrate the same occupancy schedule, but with different levels of granularity (thus changing the amount of signaling overhead needed in the TIP 318).

Figure 10A:
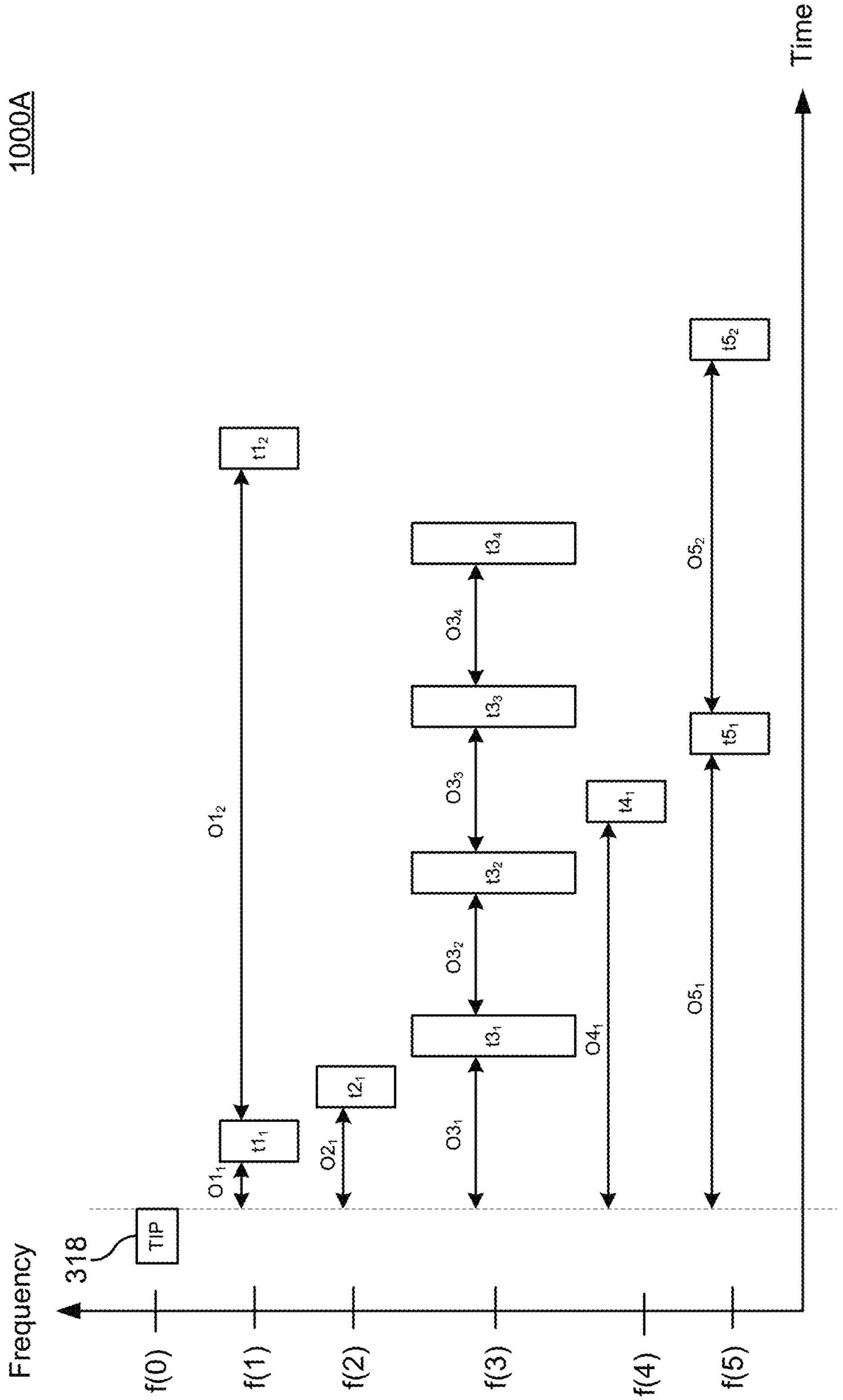
FIG. 10A-10D are timing diagrams illustrating frequency and time periods which may be occupied by various devices in an environment, according to example implementations of the present disclosure.

Referring specifically to FIG. 10A, at a first time instance, a device 302 may be configured to broadcast the TIP 318 on the advertising channel (e.g., a first frequency, or f(0)). The TIP 318 may include a timestamp or time indication which identifies a reference time (shown as a dotted line) in which the TIP 318 is generated. The TIP 318 may include, indicate, or otherwise identify one or more frequencies (f), one or more offsets (O), and one or more time periods (t). The frequencies, f, may indicate or otherwise identify one or frequencies corresponding to a channel which is to be used for exchanging traffic between two devices. For example, the frequencies may be center frequencies of the channel. The offset, O, may indicate or otherwise identify an offset from a time instance in which a channel is to be occupied. The time periods, t, may indicate or otherwise identify a start of a time period in which the frequency is to be occupied for exchanging traffic between the two devices. The TIP 318 for each frequency, f, may include corresponding offset(s), O, and time period(s), t.

As shown in FIG. 10A, for the first frequency f(1), the TIP 318 may indicate or otherwise identify a first offset $O1_1$ between a first time period $t1_1$ and the reference time, and identify a second offset $O1_2$ between the first time period $t1_1$ and a second time period $t1_2$. During the first time period $t1_1$ and the second time period $t1_2$, a device 302 may exchange traffic with another device 302 in the environment on the frequency f(1). Similarly, for the third frequency f(3), the TIP 318 may indicate a first offset $O3_1$ between a first time period $t3_1$ and the reference time, identify a second offset $O3_2$ between the first time period $t3_1$ and a second time period $t3_2$, identify a third offset $O3_3$ between the second time period $t3_2$ and a third time period $t3_3$, and identify a fourth offset $O3_4$ between the third time period $t3_3$ and a fourth time period $t3_4$. During these time periods $t3_1$ and the second time period $t1_2$, a device 302 may exchange traffic with another device 302 in the environment on the frequency f(3). An example payload of a TIP 318 used to indicate a traffic pattern according to the embodiment of FIG. 10A is shown in Table 1 below.

TABLE 1

First Embodiment of Media Access Control Payload for TIP.

| MAC Payload | | Bits | Bytes | Additional Context |
|---|---|---|---|---|
| Per-Frequency Information Field j | Traffic Type | 3 | 1 | 0: NB UWB; 1: UWB; 2: Wi-Fi; 3: BT; 4: MulteFire; 5-8 Reserved |
| | Mini-Slot Duration | 2 | | 1: 250 μS; 2: 500 μS; 3: 1 ms; 4 Reserved (could be hard coded and not signaled) |
| | Reserved | 3 | | |
| | Center Frequency fj | 8 | 1 | |
| | Max TX Power over antennas | 8 | 1 | Units in dBm (step size 0.25 dB), max value of 30 dBm |
| | UWB Preamble Code | 8 | 1 | If applicable, preamble code used |
| | Num_blocks N | 8 | 1 | Number of blocks reported for f(j) |
| | First Block Interval ($Oj_1$) | 16 | 2 | Time remaining in mini-slot until start of first time period relative to TIP |
| | Block Duration ($tj_1$) | 8 | 1 | Duration of time period on f(j) in mini-slots |
| | Second Block Interval ($Oj_2$) | 8 | 1 | Time remaining in mini-slot until start of second time period relative to first time period |
| | Block Duration ($tj_2$) | 8 | 1 | Duration of time period on f(j) in mini-slots |
| | | | | . . . |

For the timing diagram 1000A illustrated in FIG. 10A, the TIP 318 may provide granular information on each of the offsets, time periods, and frequencies. As such, the TIP 318 may involve some signaling overhead as a result. However, with the TIP 318 providing such granular information may provide for increased efficiency of resource usage, by facilitating establishing connections on channels which are not occupied for certain time periods.

Figure 10B:
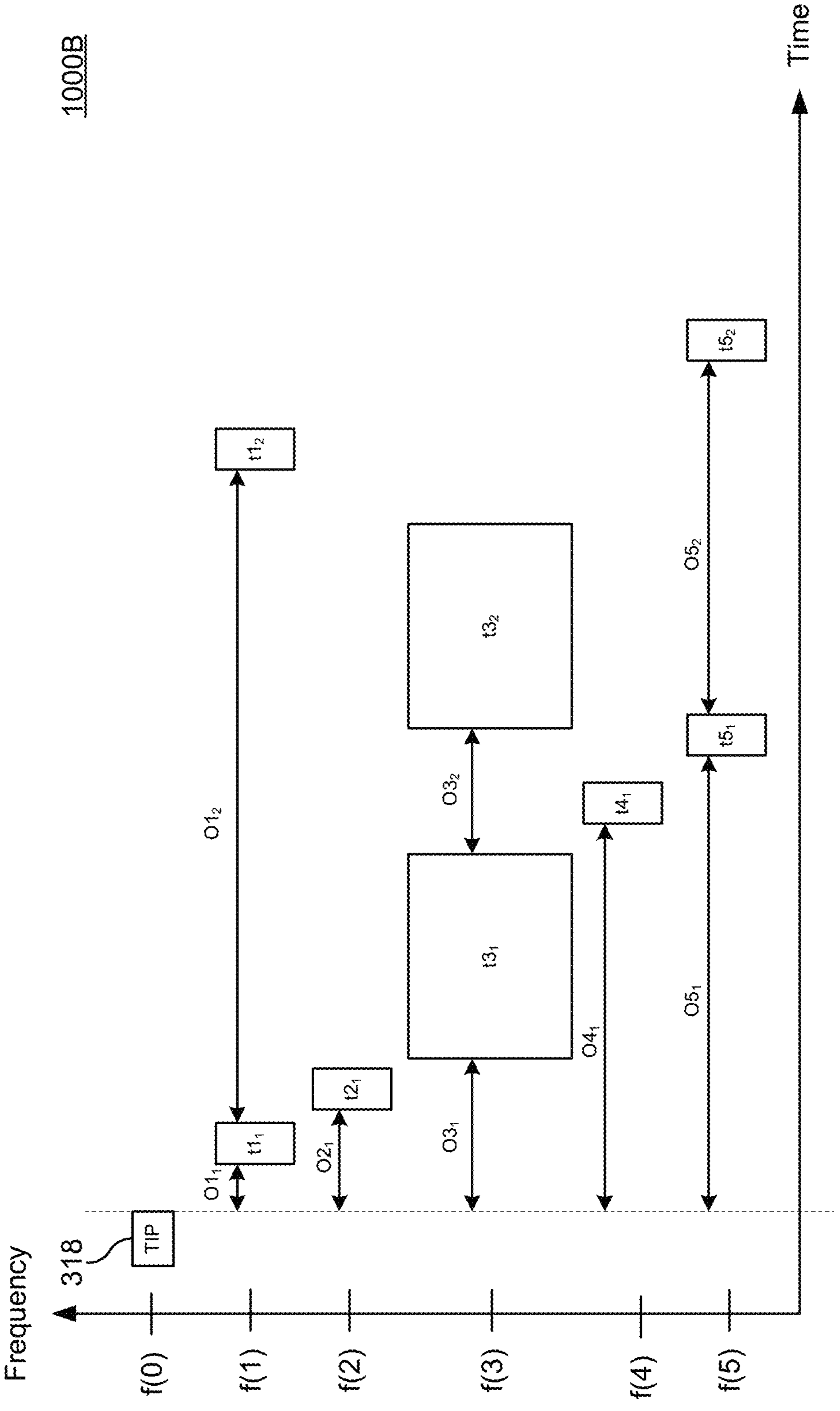
Figure 10C:
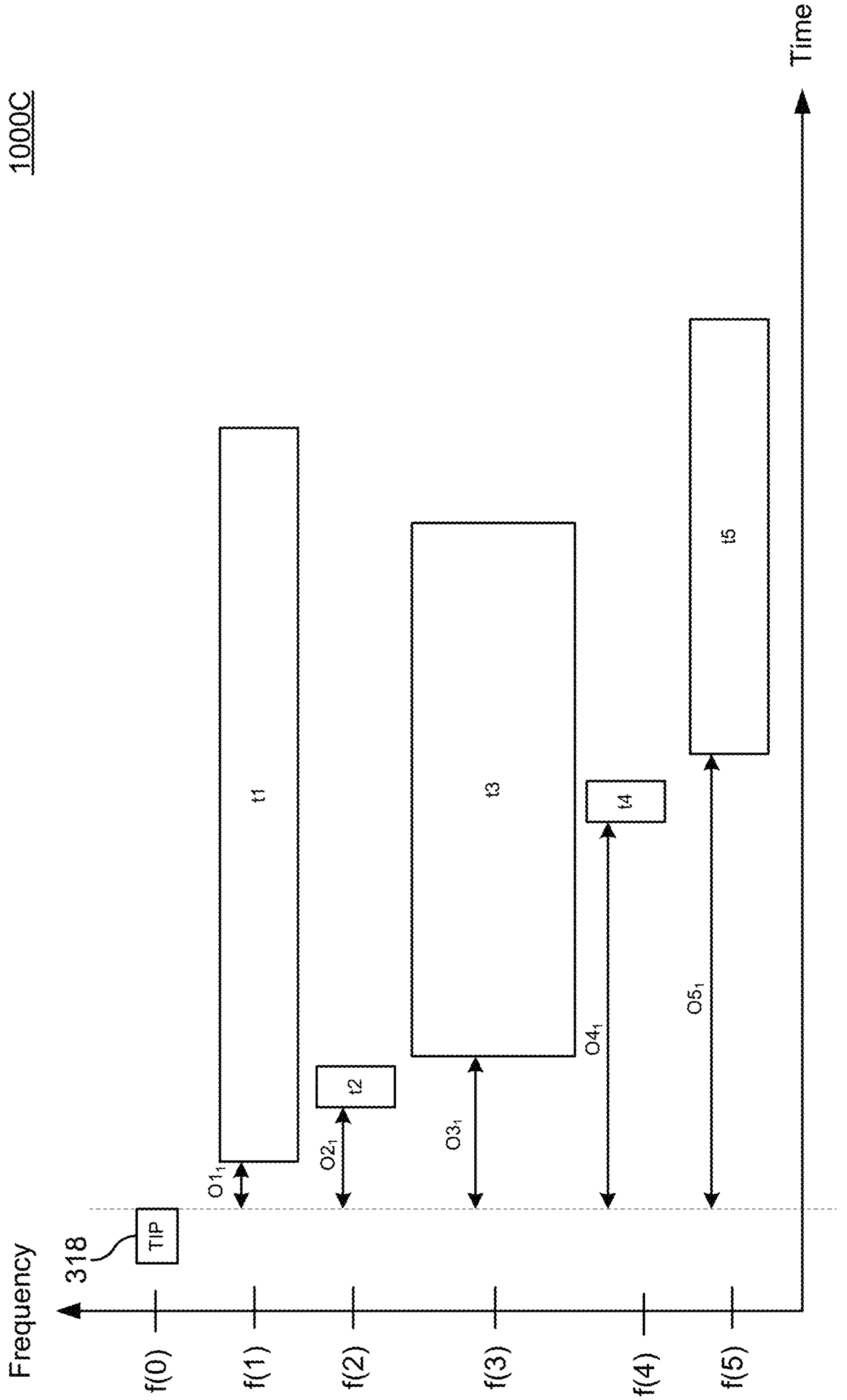

The TIP 318 corresponding to the timing diagram 1000B shown in FIG. 10B may result in similar benefits as those described above with reference to FIG. 10A, with less signaling overhead. For example, in the timing diagram 1000B, time periods which are on the same frequency f, without intervening time periods on a different frequency, may be combined into a single time period. In this regard, a certain frequency, f, may be reserved for a greater duration, provided that an intervening time period is not reserved on a different frequency. In the timing diagram 1000B of FIG. 10B, as compared to the timing diagram 1000A of FIG. 10A, the time periods $t3_1$ and $t3_2$ (of FIG. 10A) may be combined into a single time period $t3_1$ (of FIG. 10B). Similarly, the time periods $t3_3$ and $t3_4$ (of FIG. 10A) may be combined into a single time period $t3_2$ (of FIG. 10B). In this regard, less signaling overhead may be needed in the TIP 318, based on combination of the time periods (e.g., by signaling two time periods and offsets for f(3) in the TIP 318 used for FIG. 10B, as compared to signaling four time periods and offsets for f(3) in the TIP 318 used for FIG. 10A). With reference to FIG. 10C, the timing diagram 1000C may combine each of the time periods, t, on a given frequency, f, into a single time period. In this regard, the signaling overhead is reduced for the corresponding TIP 318, by signaling one offset, O, and time period, t, per frequency which is to be used.

An example payload of a TIP 318 used to indicate a traffic pattern according to the embodiment of FIG. 10B and/or the embodiment of FIG. 10C could be substantially the same as Table 1 provided above. Another example payload of a TIP used to indicate a traffic pattern according to the embodiment of FIG. 10B or FIG. 10C (or the embodiment of FIG.

10A) is shown in Table 2 below, which in this example, results in seven total bytes per frequency.

TABLE 2

Second Embodiment of Media Access Control Payload of TIP.

| MAC Payload | | Bits | Bytes | Additional Context |
|---|---|---|---|---|
| Per-Frequency Information Field j | Traffic Type | 3 | 1 | 0: NB UWB; 1: UWB; 2: Wi-Fi; 3: BT; 4: MulteFire; 5-8 Reserved |
| | Mini-Slot Duration | 2 | | 1: 250 μS; 2: 500 μS; 3: 1 ms; 4 Reserved (could be hard coded and not signaled) |
| | Reserved | 3 | | |
| | Center Frequency fj | 8 | 1 | |
| | Max TX Power over antennas | 8 | 1 | Units in dBm (step size 0.25 dB), max value of 30 dBm |
| | UWB Preamble Code | 8 | 1 | If applicable, preamble code used |
| | First Block Interval ($Oj_1$) | 16 | 2 | Time remaining in mini-slot until start of first time period relative to TIP |
| | Block Duration ($tj_1$) | 8 | 1 | Duration of time period on f(j) in mini-slots |
| | | | | . . . |

Figure 10D:
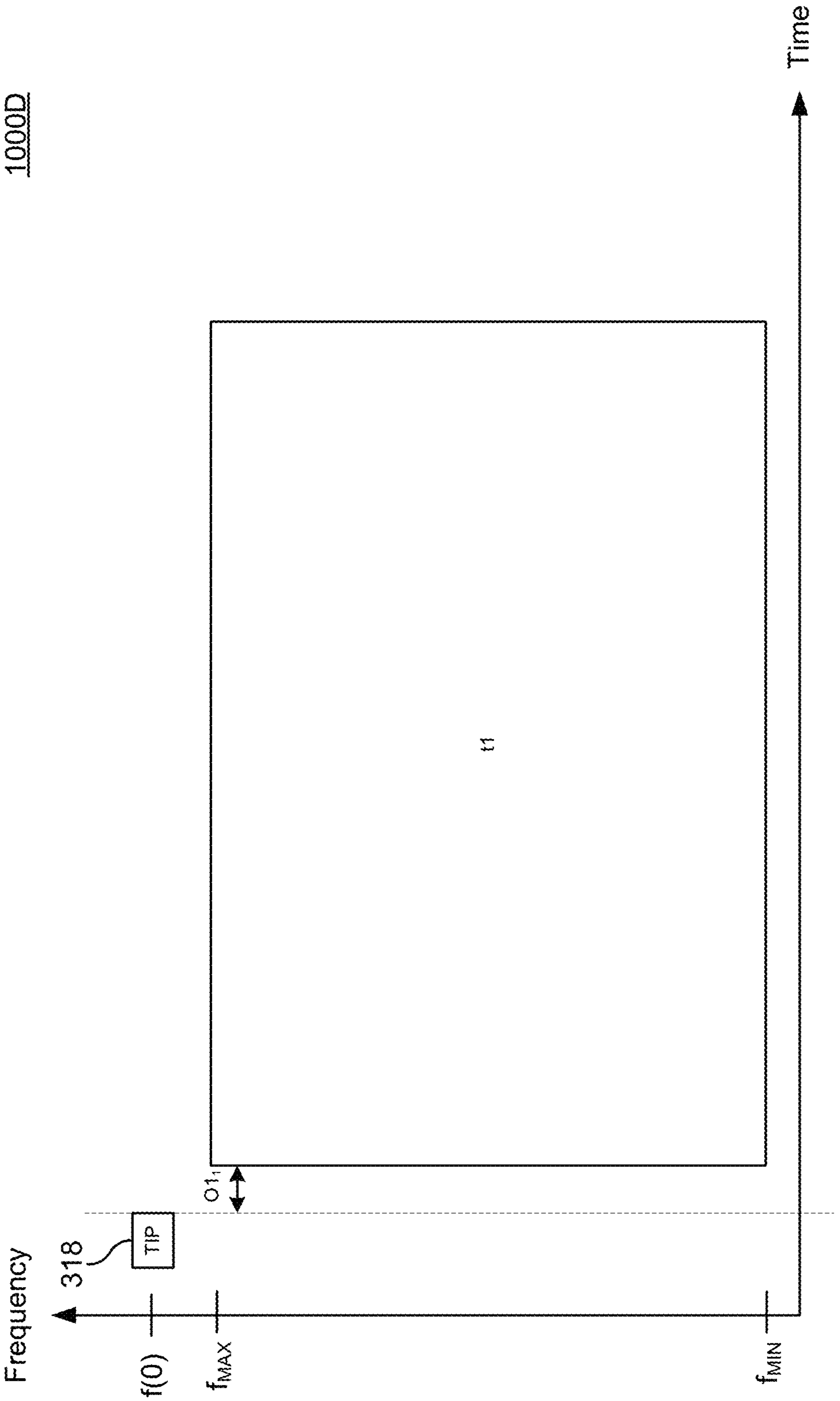

With reference to FIG. 10D, the timing diagram 1000D may combine and span across each of the frequencies and time periods (e.g., spanning from minimum and maximum frequencies, between the earliest and latest time periods across those frequencies). In this regard, the signaling overhead is reduced for the corresponding TIP 318, by signaling one offset, a minimum frequency, a maximum frequency, and one time period. Another example payload of a TIP used to indicate a traffic pattern according to the embodiments described herein is shown in Table 3 below.

TABLE 3

Third Embodiment of Media Access Control Payload of TIP.

| MAC Payload | | Bits | Bytes | Additional Context |
|---|---|---|---|---|
| Per-Frequency Information Field j | Traffic Type | 3 | 1 | 0: NB UWB; 1: UWB; 2: Wi-Fi; 3: BT; 4: MulteFire; 5-8 Reserved |
| | Mini-Slot Duration | 2 | | 1: 250 μS; 2: 500 μS; 3: 1 ms; 4 Reserved (could be hard coded and not signaled) |
| | Reserved | 3 | | |
| | Bitmap | 6 | 1 | Bitmap can define which channels/frequencies are to be used, where each bit represents a corresponding channel or frequency |
| | Max TX Power over antennas | 8 | 1 | Units in dBm (step size 0.25 dB), max value of 30 dBm |
| | UWB Preamble Code | 8 | 1 | If applicable, preamble code used |
| | First Block Interval (Oj) | 16 | 2 | Time remaining in mini-slot until start of first time period relative to TIP |
| | Block Duration (tj) | 24 | 3 | Block Duration |
| | | | | . . . |

Figure 11A:
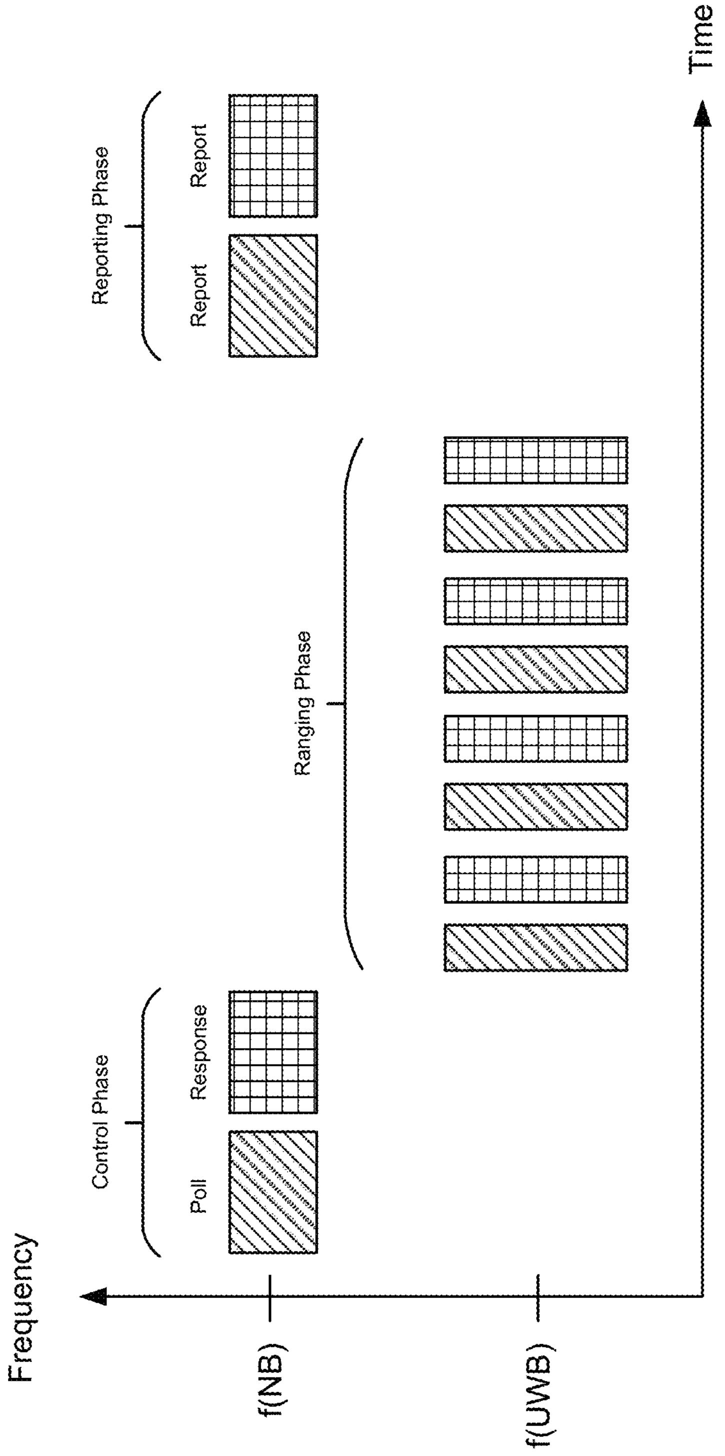
FIG. 11A-11D are timing diagrams for a use case of a ranging procedure between two devices, according to an example implementation of the present disclosure.
Figure 11B:
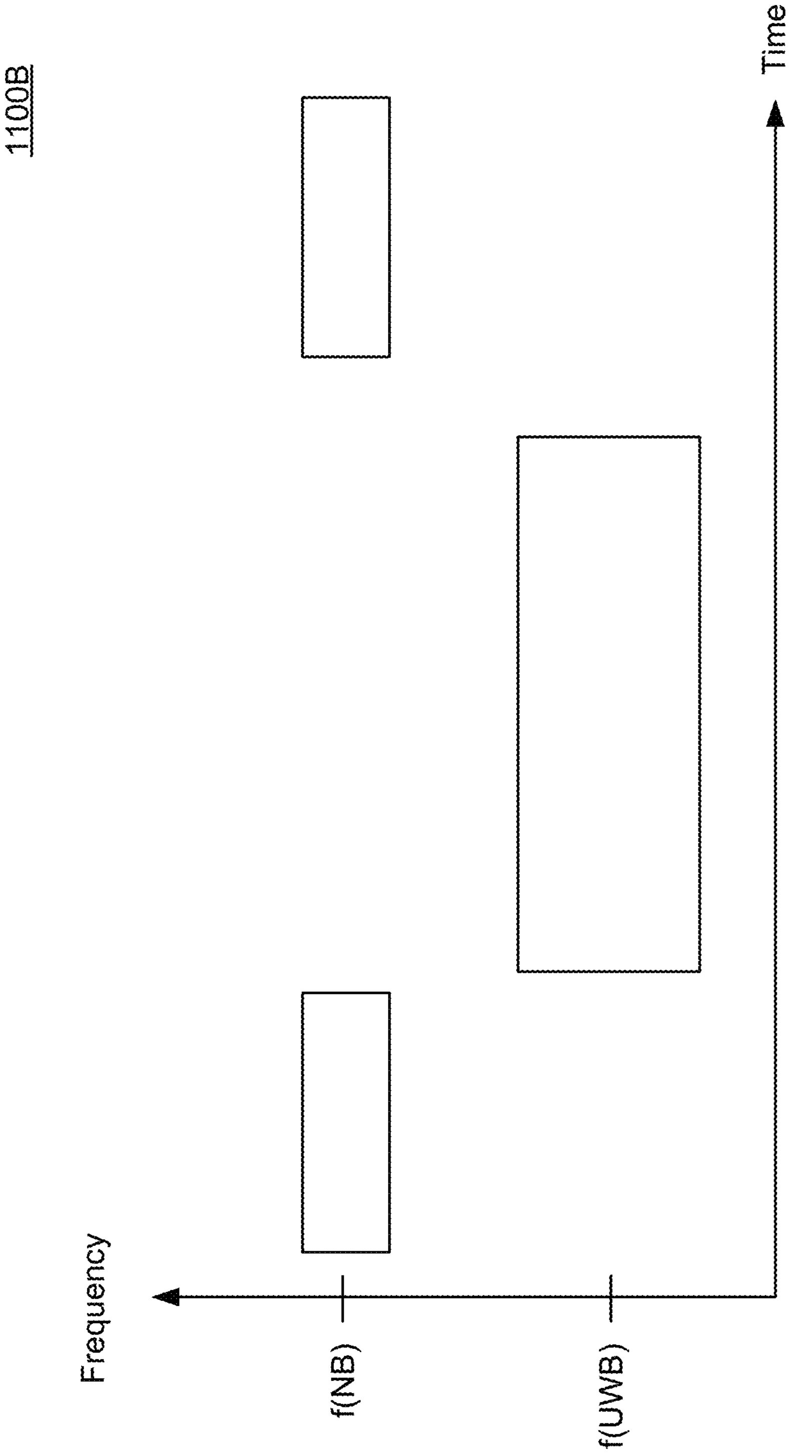
Figure 11C:
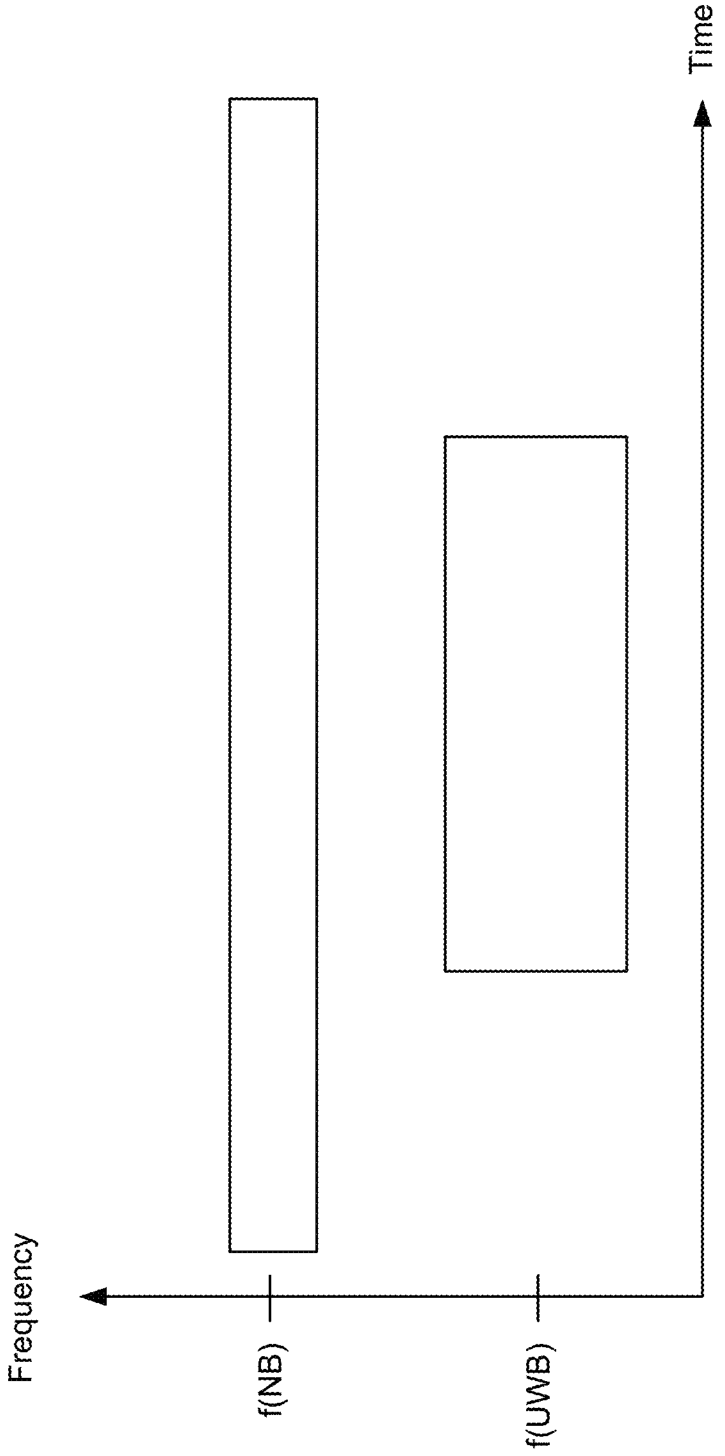
Figure 11D:
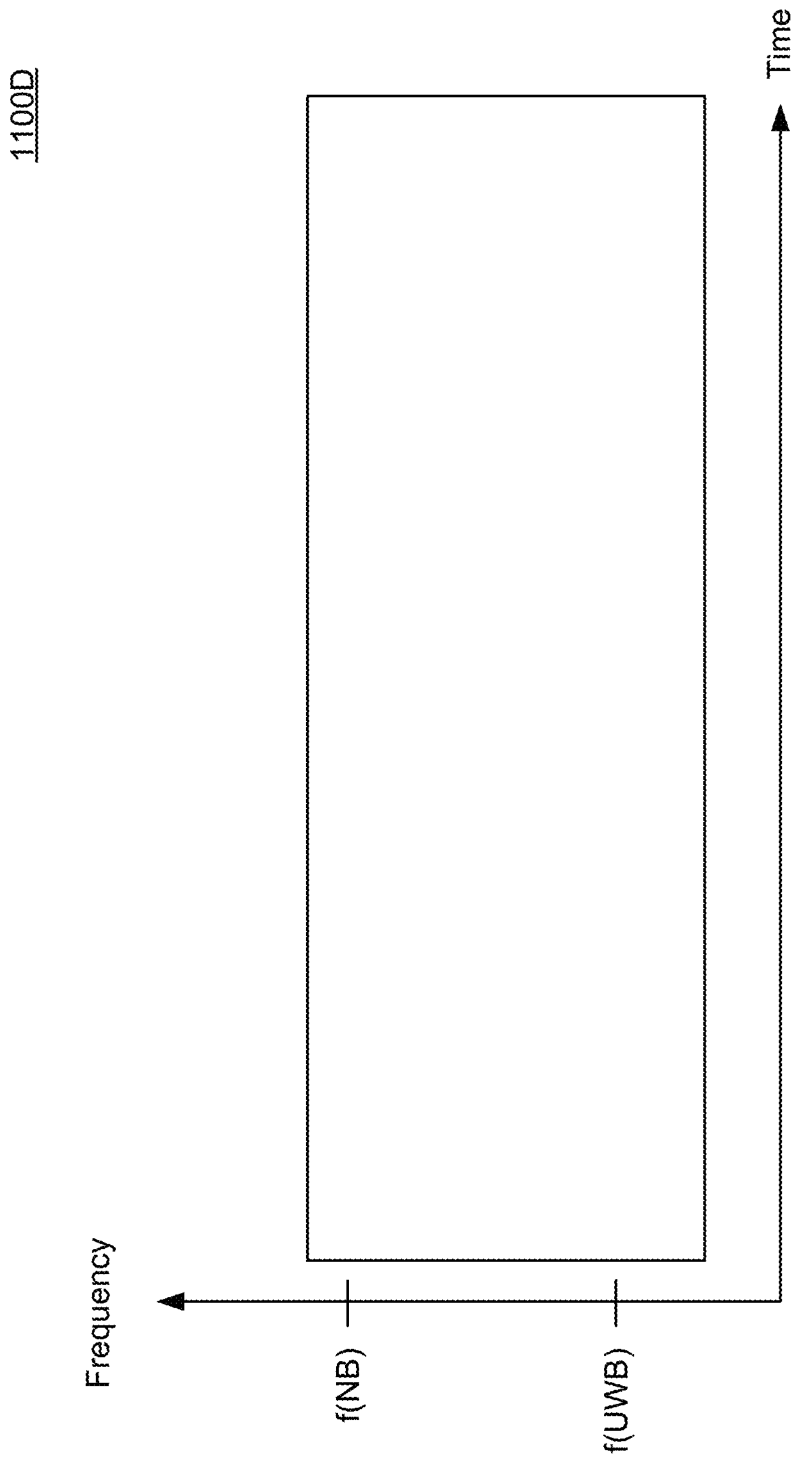

Referring to FIG. 11A-FIG. 11D, depicted are example timing diagrams 1100A-1100D for a use case of a ranging procedure between two devices 302, according to an example implementation of the present disclosure. As illustrated in FIG. 11A, the systems and methods described herein may be used for signaling traffic occupancy as part of a UWB ranging procedure between two devices. For example, a ranging procedure may involve a control phase (e.g., including a poll message sent by an initiator and a response message sent by a responder), a ranging phase (e.g., including measurements performed by the devices) and a reporting phase (e.g., including measurement reports sent by the devices). One of the devices 302 may be configured to generate and transmit a TIP 318 (e.g., on the advertising channel as described above), indicating a frequency to be used for the control phase and reporting phase (e.g., f(NB)), and a frequency to be used for the ranging phase (e.g., f(UWB)). In various embodiments, the device may transmit the TIP 318 using a WLAN transceiver (such as the Wi-Fi transceiver 313) on a dedicated advertising channel, perform polling and reporting using a NB transceiver (such as the BT transceiver 311), and perform ranging measurements using the UWB transceiver 309. In this regard, the devices 302 may be configured to hop between the different frequencies and wireless technologies, according to the TIP 318. Similarly, the TIP 318 may indicate to other nearby devices 302 that the corresponding frequencies are to be occupied for the corresponding time period, and can occupy other channels/frequencies accordingly.

In the particular implementations of the timing diagrams 1100A-1100D, the TIP 318 may be configured in a manner similar to the embodiments shown in FIG. 10A-FIG. 10D. In this regard, the TIP may have different levels of granularity, which result in different degrees of signaling overhead and resource efficiency utilization of the medium.

Figure 12:
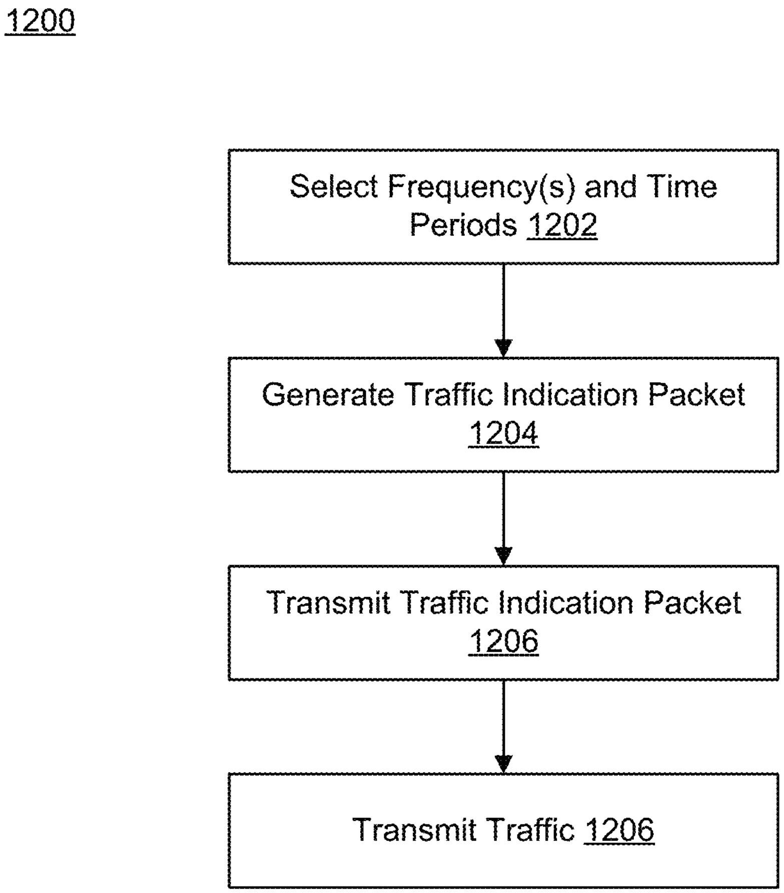
FIG. 12 is a flowchart showing an example method for facilitating coexistence, according to an example implementation of the present disclosure.

Referring now to FIG. 12, depicted is a flowchart of an example method 1200 of facilitating coexistence, according to an example implementation of the present disclosure. The method 1200 may be performed by the devices, components, elements, or hardware described above with reference to FIG. 1-FIG. 11D. As a brief overview, at step 1202, a first device may select one or more frequencies and one or more time periods. At step 1204, the first device may generate a traffic indication packet. At step 1206, the first device may transmit the traffic indication packet. At step 1208, the first device may transmit traffic.

At step 1202, a first device may select one or more frequencies and one or more time periods. In some embodiments, the first device may select the frequency(s) and time period(s) in which to exchange traffic with a second device. The first device may select the frequency(s) and time period(s) based on or according to the traffic or a traffic type of the traffic which is to be exchanged with the second device. The first device may select the frequency(s) and time period(s) responsive to determining to establish a connection with the second device (e.g., for exchanging traffic). For example, the first device may determine to establish the connection, responsive to receiving a selection/request to launch an application or resource which involves exchanging traffic between the devices. The first device may select the frequency(s) and time period(s) based on the application, an application type, the traffic type, or the traffic. For instance, the first device may select the time period(s) based on whether the traffic is periodic traffic or bursty traffic. As another example, the first device may select the frequency(s) based on whether the traffic is to use a higher bandwidth or lower bandwidth (e.g., involving different amounts of traffic for exchanging between the devices).

In some embodiments, the first device may select a plurality of frequencies. For example, the first device may select a plurality of frequencies which are to be used as part of a frequency hopping pattern for maintaining the connection between the first device and the second device. The first device may select the frequencies based on the wireless communication technology (or technologies) to be used for supporting the connection/exchange of traffic.

In some embodiments, the frequency(s) may include a frequency range. For instance, the frequency range may be a minimum and maximum frequency corresponding to selected channels. For example, where the first device selects three channels corresponding to three different frequencies, the frequency range may include the minimum frequency corresponding to one of the three channels having the lowest frequency (e.g., center frequency) and the maximum frequency corresponding to a different one of the three channels having the highest frequency (e.g., center frequency).

In some embodiments, the first device may identify a plurality of time periods. For example, for periodic traffic, the first device may identify a plurality of time periods to be used for exchanging periodic traffic between the devices. The time periods may correspond to the selected frequency(s). In other words, one frequency selected by the first device may include a corresponding selection of one or more time periods in which that frequency is to be used. The time periods may include an offset and a duration. The duration may be a duration in which the frequency is to be used for the given time period. The offset may be a difference between a start time of the time period and another time instance (such as a reference time, a termination time of a previous time period, etc.).

At step 1204, the first device may generate a traffic indication packet. The first device may generate the traffic indication packet to indicate one or more frequencies and one or more time periods in which the first device is to exchange traffic with the second device. The first device may generate the traffic indication packet to indicate the frequency(s) and time period(s) selected at step 1202. The first device may generate the traffic indication packet to include a payload similar to the MAC payloads above in Table 1-Table 3. The traffic indication packet may include one or more frequencies, and for each frequency, one or more time periods and offsets. Such information may be included, incorporated into, or otherwise indicated in the payload of the TIP as described above.

At step 1206, the first device may transmit the traffic indication packet. In some embodiments, the first device may transmit the traffic indication packet to one or more other devices in an environment of the first device. For example, the first device may transmit the traffic indication packet to the second device and/or one or more additional devices. For instance, the first device may transmit the traffic indication packet by broadcasting the traffic indication packet to devices in wireless proximity to the first device. The first device may transmit the packet prior to communicating/exchanging traffic with the second device. The first device may transmit (or broadcast) the traffic indication packet on an advertising channel. The advertising channel may be or include a dedicated channel of a wireless communication technology. For example, the first device may transmit the traffic indication packet on a dedicated WLAN channel and/or a dedicated WPAN channel.

At step 1208, the first device may transmit traffic. In some embodiments, the first device may transmit traffic to the second device, on one or more channels corresponding to the one or more frequencies, during the one or more time periods. The first device may transmit traffic to the second device (and/or receive traffic from the second device) according to the traffic indication packet. The first device may transmit the traffic responsive to transmitting the traffic indication packet at step 1206. The first device may transmit the traffic according to the traffic pattern indicated/identified in the traffic indication packet. For example, where the traffic indication packet includes information related to a first frequency which is to be used for a first time period after a first offset, the first device may transmit traffic to the second device on a channel corresponding to the first frequency, beginning at a start time corresponding to the first offset, and for a duration corresponding to the time period.

In some embodiments, the first device may hop between frequencies and wireless communication technologies. For example, the first device may transmit first traffic to the second device on a first channel, via a wireless local area network (WLAN), and may transmit second traffic to the second device on a second channel, via a wireless personal area network (WPAN) (such as UWB or BT).

Figure 13:
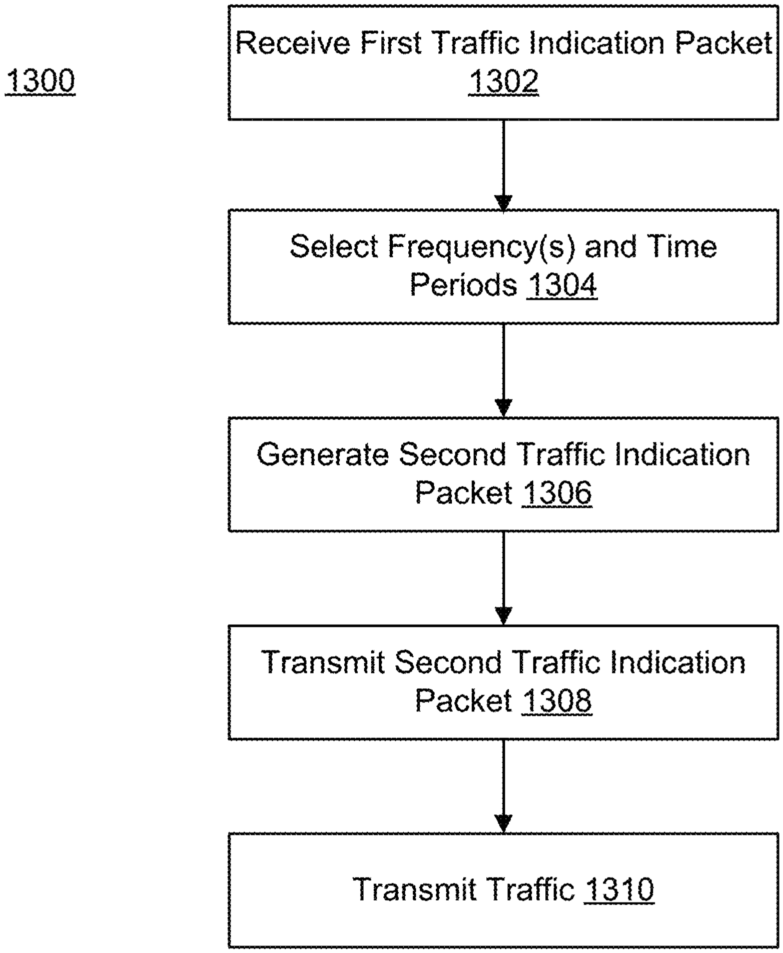
FIG. 13 is another flowchart showing an example method for facilitating coexistence, according to an example implementation of the present disclosure.

Referring now to FIG. 13, depicted is a flowchart of an example method 1300 of facilitating coexistence, according to an example implementation of the present disclosure. The method 1300 may be performed by the devices, components, elements, or hardware described above with reference to FIG. 1-FIG. 11D. As a brief overview, at step 1302, a first device may receive a traffic indication packet. At step 1304, the first device may select one or more frequencies and one or more time periods. At step 1306, the first device may generate a traffic indication packet. At step 1308, the first device may transmit the traffic indication packet. At step 1310, the first device may transmit traffic.

At step 1302, the first device may receive a traffic indication packet. In some embodiments, the first device receives a traffic indication packet from a second device on an advertising channel. The traffic indication packet may indicate one or more frequencies and one or more time periods in which the second wireless communication device is to exchange traffic. The first device may receive the traffic indication packet responsive to the second device (referred to as first device with reference to FIG. 12) transmitting the traffic indication packet at step 1206. In other words, method 1300 may be performed by another device in an environment which includes the first device which executed method 1200.

At step 1304, the first device may select one or more frequencies and one or more time periods. In some embodiments, the first device may select one or more channels on which to communicate traffic with a third wireless communication device. The first device may select the one or more frequencies and one or more time periods according to the traffic indication packet received at step 1302. In some embodiments, step 1304 may be similar to step 1202 described above. However, the first device may select the channel(s) and time periods according to information indicating the traffic pattern to be used by the device which performed the method 1200. In this regard, the first device may select channels and time periods taking into consideration frequencies and time periods which may already be used by a different device in the environment. For example, and in some embodiments, the first device may select an intermediate time period, between a first time period and a second time period of the traffic indication packet, in which to transmit traffic on the channel(s). In this regard, the first device may select a time period in which to occupy the same channel that may be used by another device, based on the information included in the traffic indication packet. Similarly, the first device may select one or more channels (e.g., corresponding to one or more frequencies) based on or according to the information included in the traffic indication packet.

Once the first device selects the frequencies, time periods, and channels, at step 1306, the first device may generate a second traffic indication packet, and at step 1308, the first device may transmit the second traffic indication packet. Steps 1306 and 1308 may be substantially the same as step 1204 and 1206 described above. In this regard, the first device may generate and transmit a second traffic indication packet on the same advertising channel (e.g., in which the first traffic indication packet was received at step 1302), to inform other devices in the environment of the first device's traffic pattern. At step 1310, the first device may transmit traffic, which may be substantially the same as step 1208.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:

transmitting, by a first wireless communication device comprising a first user device, a traffic indication packet (TIP) on an advertising channel, the TIP indicating one or more frequencies and one or more time periods in which the first wireless communication device is to exchange traffic on a first network with a second wireless communication device comprising a second user device, the first network operating within a frequency range which at least partially overlaps a frequency range of a second network, the first network and second network within a common environment including the first wireless communication device and the second wireless communication device; and transmitting, by the first wireless communication device, traffic to the second wireless communication device, on one or more channels corresponding to the one or more frequencies, during the one or more time periods.

2. The method of claim 1, wherein the one or more frequencies comprises a plurality of frequencies corresponding to a frequency hopping pattern.

3. The method of claim 1, wherein the one or more time periods comprise a first time period for a first frequency of the one or more frequencies, the first time period comprising an offset and a duration.

4. The method of claim 3, wherein the one or more time periods comprise a second time period for the first frequency, the second time period comprising a second offset and a second duration.

5. The method of claim 1, wherein the one or more frequencies comprises a frequency range between a minimum frequency and a maximum frequency, wherein the minimum frequency corresponds to a first channel of the one or more channels and the maximum frequency corresponds to a second channel of the one or more channels.

6. The method of claim 1, wherein transmitting the TIP on the advertising channel comprises broadcasting, by the first wireless communication device, the TIP on the advertising channel.

7. The method of claim 1, wherein the advertising channel comprises a dedicated channel of at least one of a wireless local area network (WLAN) or a wireless personal area network (WPAN).

8. The method of claim 1, wherein the first wireless communication device comprises an ultrawideband (UWB)

device, the UWB device comprising at least one of a narrowband (NB) UWB device or a NB-assisted (NBA) UWB device.

9. The method of claim 1, wherein transmitting the traffic to the second wireless communication device comprises:

transmitting, by the first wireless communication device, first traffic to the second wireless communication device on a first channel, the first traffic transmitted via a wireless local area network (WLAN) to the second wireless communication device; and transmitting, by the first wireless communication device, second traffic to the second wireless communication device on a second channel, the second traffic transmitted via a wireless personal area network (WPAN) to the second wireless communication device.

10. A first wireless communication device comprising a first user device, the first wireless communication device comprising:

one or more wireless transceivers; and one or more processors configured to:

transmit, via the one or more wireless transceivers, a traffic indication packet (TIP) on an advertising channel, the TIP indicating one or more frequencies and one or more time periods in which the first wireless communication device is to exchange traffic on a first network with a second wireless communication device comprising a second user device, the first network operating within a frequency range which at least partially overlaps a frequency range of a second network, the first network and second network within a common environment including the first wireless communication device and the second wireless communication device; and transmit, via the one or more wireless transceivers, traffic to the second wireless communication device, on one or more channels corresponding to the one or more frequencies, during the one or more time periods.

11. The first wireless communication device of claim 10, wherein the one or more frequencies comprises a plurality of frequencies corresponding to a frequency hopping pattern.

12. The first wireless communication device of claim 10, wherein the one or more time periods comprise a first time period for a first frequency of the one or more frequencies, the first time period comprising an offset and a duration.

13. The first wireless communication device of claim 12, wherein the one or more time periods comprise a second time period for the first frequency, the second time period comprising a second offset and a second duration.

14. The first wireless communication device of claim 10, wherein the one or more frequencies comprises a frequency range between a minimum frequency and a maximum frequency, wherein the minimum frequency corresponds to a first channel of the one or more channels and the maximum frequency corresponds to a second channel of the one or more channels.

15. The first wireless communication device of claim 10, wherein the one or more processors are configured to broadcast, via the one or more wireless transceivers, the TIP on the advertising channel.

16. The first wireless communication device of claim 10, wherein the advertising channel comprises a dedicated channel of at least one of a wireless local area network (WLAN) or a wireless personal area network (WPAN).

17. The first wireless communication device of claim 10, wherein the first wireless communication device comprises an ultrawideband (UWB) device, the UWB device comprising at least one of a narrowband (NB) UWB device or a NB-assisted (NBA) UWB device.

18. The first wireless communication device of claim 10, wherein the one or more processors are configured to:

transmit, via a first wireless transceiver, first traffic to the second wireless communication device on a first channel, the first traffic transmitted via a wireless local area network (WLAN) to the second wireless communication device; and transmit, via a second wireless transceiver, second traffic to the second wireless communication device on a second channel, the second traffic transmitted via a wireless personal area network (WPAN) to the second wireless communication device.

19. A method, comprising:

receiving, by a first wireless communication device comprising a first user device from a second wireless communication device comprising a second user device, a first traffic indication packet (TIP) on an advertising channel, the first TIP indicating one or more frequencies and one or more time periods in which the second wireless communication device is to exchange traffic on a first network, the first network operating within a frequency range which at least partially overlaps a frequency range of a second network, the first network and second network within a common environment including the first wireless communication device, the second wireless communication device, and a third wireless communication device comprising a third user device;

selecting, by the first wireless communication device, one or more channels on which to communicate traffic with the third wireless communication device, according to the first TIP;

transmitting, by the first wireless communication device, a second TIP on an advertising channel, the second TIP indicating the one or more channels on which to communicate the traffic with the third wireless communication device; and transmitting, by the first wireless communication device, the traffic to the third wireless communication device, on the selected one or more channels.

20. The method of claim 19, further comprising:

selecting, by the first wireless communication device, an intermediate time period, between a first time period and a second time period of the TIP, in which to transmit the traffic on the one or more channels.

* * * * *